US011560690B2

(12) United States Patent
Halder et al.

(10) Patent No.: US 11,560,690 B2
(45) Date of Patent: Jan. 24, 2023

(54) TECHNIQUES FOR KINEMATIC AND DYNAMIC BEHAVIOR ESTIMATION IN AUTONOMOUS VEHICLES

(71) Applicant: SafeAI, Inc., Milpitas, CA (US)

(72) Inventors: Bibhrajit Halder, Sunnyvale, CA (US); Sudipta Mazumdar, Markham (CA)

(73) Assignee: SafeAI, Inc., Milpitas, CA (US)

( * ) Notice: Subject to any disclaimer, the term of this patent is extended or adjusted under 35 U.S.C. 154(b) by 238 days.

(21) Appl. No.: 16/709,627

(22) Filed: Dec. 10, 2019

(65) Prior Publication Data
US 2020/0181879 A1 Jun. 11, 2020

Related U.S. Application Data

(60) Provisional application No. 62/778,064, filed on Dec. 11, 2018.

(51) Int. Cl.
*E02F 9/20* (2006.01)
*E02F 9/26* (2006.01)
(Continued)

(52) U.S. Cl.
CPC ............ *E02F 9/205* (2013.01); *E02F 9/2054* (2013.01); *E02F 9/262* (2013.01); *G05B 13/048* (2013.01);
(Continued)

(58) Field of Classification Search
CPC ......... E02F 9/205; E02F 9/2054; E02F 9/262; E02F 9/261; E02F 9/264; G05B 13/048;
(Continued)

(56) References Cited

U.S. PATENT DOCUMENTS

| 9,815,462 B2 * | 11/2017 | Pandita | B60W 30/12 |
| 10,990,096 B2 * | 4/2021 | Isele | G06N 3/006 |

(Continued)

FOREIGN PATENT DOCUMENTS

JP      2012233800 A    * 11/2012

OTHER PUBLICATIONS

McAllister, R., Gal, Y., Kendall, A., van der Wilk, M., Shah, A., Cipolla, R., & Weller, A. (2017). Concrete Problems for Autonomous Vehicle Safety: Advantages of Bayesian Deep Learning. Proceedings of the Twenty-Sixth International Joint Conference on Artificial Intelligence, 4745-4753 (Year: 2017).*

(Continued)

*Primary Examiner* — Angelina Shudy
(74) *Attorney, Agent, or Firm* — Kilpatrick Townsend & Stockton LLP

(57) ABSTRACT

The present disclosure relates generally to techniques for the kinematic estimation and dynamic behavior estimation of autonomous heavy equipment or vehicles to improve navigation, digging and material carrying tasks at various industrial work sites. Particularly, aspects of the present disclosure are directed to obtaining a set of sensor data providing a representation of operation of an autonomous vehicle in a worksite environment, estimating, by a trained model comprising a Gaussian process, a set of output data based on the set of sensor data, controlling an operation of the autonomous vehicle in the worksite environment using input data derived from the set of sensor data and the set of output data, obtaining actual output data from the operation of the autonomous vehicle in the worksite environment, and updating the trained model with the input data and the actual output data.

20 Claims, 12 Drawing Sheets

(51) Int. Cl.
  *G05D 1/02*    (2020.01)
  *G07C 5/00*    (2006.01)
  *G05B 13/04*   (2006.01)

(52) U.S. Cl.
  CPC ......... *G05D 1/0219* (2013.01); *G05D 1/0221* (2013.01); *G05D 1/0274* (2013.01); *G07C 5/008* (2013.01); *G05D 2201/0207* (2013.01)

(58) Field of Classification Search
  CPC .. G05D 1/0219; G05D 1/0221; G05D 1/0274; G05D 2201/0207; G05D 2201/0202; G07C 5/008
  See application file for complete search history.

(56) References Cited

U.S. PATENT DOCUMENTS

| | | | | |
|---|---|---|---|---|
| 2008/0033645 | A1* | 2/2008 | Levinson | G01S 5/0252 701/469 |
| 2008/0300787 | A1* | 12/2008 | Zeng | G01S 13/931 701/301 |
| 2009/0076674 | A1 | 3/2009 | Kiegerl et al. | |
| 2009/0240481 | A1* | 9/2009 | Durrant-Whyte | G06Q 10/06 703/7 |
| 2014/0180444 | A1 | 6/2014 | Edara et al. | |
| 2018/0012370 | A1* | 1/2018 | Aghamohammadi | G06T 7/50 |
| 2018/0190014 | A1* | 7/2018 | Yarborough | G01S 7/4808 |
| 2018/0203447 | A1* | 7/2018 | Wyffels | G01S 17/42 |
| 2018/0209802 | A1* | 7/2018 | Jung | G01C 21/3415 |
| 2018/0273046 | A1* | 9/2018 | Berntorp | B60T 8/172 |
| 2019/0079526 | A1* | 3/2019 | Vallespi-Gonzalez | G01S 17/931 |
| 2019/0130659 | A1* | 5/2019 | Ide | G07C 5/006 |
| 2019/0204832 | A1* | 7/2019 | Abeloe | G06N 3/0445 |
| 2019/0277242 | A1* | 9/2019 | Sata | F02D 41/30 |
| 2019/0310650 | A1* | 10/2019 | Halder | G06N 3/006 |
| 2019/0310654 | A1* | 10/2019 | Halder | G05D 1/0088 |
| 2020/0027016 | A1* | 1/2020 | Rouhani | G06N 20/00 |
| 2020/0089246 | A1* | 3/2020 | McGill, Jr. | G05D 1/0088 |
| 2020/0156241 | A1* | 5/2020 | Soltani Bozchalooi | B25J 9/1697 |
| 2020/0159570 | A1* | 5/2020 | Askeland | H04W 4/40 |
| 2020/0159685 | A1* | 5/2020 | Askeland | G06F 11/34 |
| 2020/0174490 | A1* | 6/2020 | Ogale | G05D 1/0221 |
| 2020/0207375 | A1* | 7/2020 | Mehta | G05D 1/0212 |
| 2020/0293594 | A1* | 9/2020 | Raissi | G06N 7/005 |
| 2020/0326718 | A1* | 10/2020 | Kandemir | G06N 3/0427 |
| 2020/0339146 | A1* | 10/2020 | Stangl | G06N 3/08 |
| 2020/0339154 | A1* | 10/2020 | Stangl | G06N 3/08 |
| 2020/0394813 | A1* | 12/2020 | Theverapperuma | G06N 3/084 |
| 2020/0410364 | A1* | 12/2020 | Willers | G06N 3/088 |
| 2021/0070317 | A1* | 3/2021 | Hitotsumatsu | G01C 21/3461 |
| 2021/0097401 | A1* | 4/2021 | Ramalho | G06N 3/0454 |
| 2021/0223053 | A1* | 7/2021 | Louhghalam | B60W 40/06 |
| 2021/0224685 | A1* | 7/2021 | Mitra | G06N 3/08 |
| 2021/0232913 | A1* | 7/2021 | Martin | B60W 50/06 |
| 2021/0334630 | A1* | 10/2021 | Lambert | G05D 1/0088 |
| 2021/0370980 | A1* | 12/2021 | Ramamoorthy | G06N 5/045 |
| 2022/0067850 | A1* | 3/2022 | Bhasme | B60L 15/2045 |
| 2022/0092983 | A1* | 3/2022 | Hong | G06T 7/292 |
| 2022/0097726 | A1* | 3/2022 | Buchanan | G05D 1/0214 |

OTHER PUBLICATIONS

Chapelle, Li, An Empirical Evaluation of Thompson Sampling (Year: 2011).*
Hara et al, 6DOF Iterative Closest Point Matching Considering A Priori with Maximum A Posteriori Estimation (Year: 2013).*
International Patent Application No. PCT/US2019/065516, International Search Report and Written Opinion dated Feb. 25, 2020, 10 pages.
Jain et al., "Learning and Control Using Gaussian Processes" Penn Libraries, University of Pennsylvania Scholarly Commons, Real-Time and Embedded Systems Lab (mLAB), School of Engineering Applied Science, In Proceedings of the 9$^{th}$ ACM/IEEE International Conference on Cyber-Physical Systems (ICCPS), Feb. 21, 2018, 12 pages.

* cited by examiner

TECHNIQUES FOR KINEMATIC AND DYNAMIC BEHAVIOR ESTIMATION IN AUTONOMOUS VEHICLES

CROSS-REFERENCES TO RELATED APPLICATIONS

This application claims the benefit of and priority to U.S. Provisional Application No. 62/778,064 filed Dec. 11, 2018, entitled "Methods And Systems Of Estimating Heavy Equipment Kinematics And Dynamic Behavior To Improve Digging And Material Carrying Task", the contents of which are incorporated by reference herein in their entirety for all purposes.

TECHNICAL FIELD

The present disclosure relates generally to the autonomous operation of heavy equipment or vehicles to perform various tasks, and more particularly to techniques for the kinematic estimation and dynamic behavior estimation of autonomous heavy equipment or vehicles to improve performance of tasks such as navigation, digging and material performed by the autonomous heavy equipment or vehicles.

BACKGROUND

The increasing use of autonomous machines is changing the way traditional tasks are performed. As a result, autonomous machines are increasingly being used in various domains. For example, an increasing number of autonomous machines in the form of autonomous trucks, bulldozers, loaders, excavators, etc. are being used at various work sites such as industrial work sites, mining sites, construction sites, commercial sites, manufacturing sites and so on. For instance, at a mine site, tasks performed by autonomous machines located at a mining site may involve using autonomous excavators to excavate materials, using autonomous loaders or bulldozers (dozers) to load materials into autonomous trucks, using autonomous trucks to transport the materials or objects from one location to another within the site, and so on. Unlike traditional machines, the use of autonomous machines for performing tasks has given rise to a whole new set of problems, especially in sites such as mines, etc. where diverse off-road conditions across the site can pose significant problems. The autonomous nature of the machines for performing tasks also presents unique problems in how tasks are allocated and controlled, and how the tasks are performed by a set (or fleet) of autonomous machines, either individually or cooperatively.

BRIEF SUMMARY

The present disclosure relates generally to the autonomous operation of heavy equipment or vehicles to perform various tasks, and more particularly to techniques for the kinematic estimation and dynamic behavior estimation of autonomous heavy equipment or vehicles to improve navigation, digging and material carrying tasks at various industrial work sites. Various inventive embodiments are described herein, including methods, systems, non-transitory computer-readable storage media storing programs, code, or instructions executable by one or more processors, and the like.

An infrastructure is provided that improves the control of autonomous systems such as autonomous vehicles, autonomous machines, and the like. An autonomous vehicle management system (also referred to as a controller system) is described that is configured to automatically control one or more autonomous functions or operations performed by the vehicle or machine in diverse off-road conditions such that the autonomous operations are performed in a safe manner.

Examples of autonomous operations include, without limitation, autonomous driving or navigation along a path, scooping and dumping operations, moving materials or objects (e.g., moving dirt or sand from one area to another), lifting materials, driving, rolling, spreading dirt, excavating, transporting materials or objects from one point to another point, and the like.

In various embodiments, the autonomous vehicle management system is configured to receive sensor data from one or more sensors associated with an autonomous vehicle. Based upon this sensor data, the autonomous vehicle management system is configured to generate and keep updated an internal map for the autonomous vehicle, where the internal map includes information representative of the autonomous vehicle's state of the autonomous vehicle's environment (e.g., objects detected in the vehicle's environment). Based upon the internal map and based upon other inputs, such as the goal (e.g., change lanes, turn left/right, perform a specialized operation such as digging, scooping, etc.) to be performed by the autonomous vehicle, safety considerations, and the like, the autonomous vehicle management system is configured to generate a plan of action for the autonomous vehicle such that the goal is achieved in a safe manner. The plan of action may identify a sequence of one or more planned actions to be performed by the autonomous vehicle in order for the autonomous vehicle to achieve the goal in a safe manner. The autonomous vehicle management system may then control one or more vehicle systems (e.g., braking system, steering system, propulsion system for driving the autonomous vehicle, electrical systems, auxiliary systems (e.g., systems for outputting information to a driver or passenger of the autonomous vehicle) to perform the actions in the plan of action.

The autonomous vehicle management system may use various artificial intelligence (AI) based techniques (e.g., lazy learning, reinforcement learning (RL) techniques, etc.) and models as part of its processing. For example, the autonomous vehicle management system may use a Bayesian model to estimate a probability distribution of an underlying function amongst all possible functions and predict output data (e.g., linear and angular velocity) from sensor data (e.g., displacement of accelerator and brakes captured by sensors mounted on the autonomous vehicle) captured by one or more sensors of the autonomous vehicle. As another example, the autonomous vehicle management system may use AI-based techniques to identify a set of actions to be included in the plan of action to be performed by the autonomous vehicle to achieve a particular goal in a stable manner.

In various embodiments, a computer-implemented method is provided that includes obtaining, by a controller system of an autonomous vehicle, a first set of sensor data providing a representation of operation of the autonomous vehicle in a worksite environment; estimating, by a trained model comprising a Gaussian process, a first set of output data based on the first set of sensor data, wherein the Gaussian process of the trained model defines a posterior distribution over one or more functions that define a relationship between independent variables and dependent variables for the operation of the autonomous vehicle in the worksite environment; controlling, by the controller system, one or more operations of the autonomous vehicle in the worksite environment using a first set of input data, wherein the first set of input data is derived from the first set of sensor data and the first set of output data; obtaining, by the controller system, actual output data from the one or more operations of the autonomous vehicle in the worksite environment; and updating, by the controller system, the trained model with the first set of input data and the actual output data, wherein the Gaussian process of the updated trained model defines an updated posterior distribution over the one or more functions that define the relationship between the independent variables and the dependent variables for the operation of the autonomous vehicle in the worksite environment.

In some embodiments, the method further comprises: obtaining, by the controller system, a second set of sensor data providing another representation of operation of the autonomous vehicle in the worksite environment; estimating, by the updated trained model, a second set of output data based on the second set of sensor data, wherein the Gaussian process of the updated trained model defines the updated posterior distribution over the one or more functions; and controlling, by the controller system, one or more operations of the autonomous vehicle in the worksite environment using input data defined based on the second set of sensor data and the second set of output data, where the updating comprises implementing a sparse method for selecting new or additional data points from the actual output data for updating the trained model.

In some embodiments, the method further comprises: operating the autonomous vehicle in the worksite environment, wherein the autonomous vehicle is operated manually or via remote control; during the operating of the vehicle in the work site environment, collecting, by a plurality of sensors, a training set of sensor data; and training a model with a Gaussian process using the training set of sensor data to generate the trained model, wherein the Gaussian process of the model defines a prior distribution over the one or more functions that define the relationship between the independent variables and the dependent variables for the operation of the autonomous vehicle in the worksite environment, and the training comprises calculating the posterior distribution over the one or more functions for the trained model based on the training set of sensor data.

In some embodiments, the method further comprises: loading a baseline model with a Gaussian process onto the autonomous vehicle, wherein the baseline model is trained on sensor data collected during operation of the autonomous vehicle in another work-site environment substantially similar to the work-site environment; operating, by the controller system, the autonomous vehicle in a safe-zone of the work-site environment; during the operating of the vehicle in the work site environment, collecting, by a plurality of sensors, a preliminary set of sensor data; and updating, by the controller system, the baseline model with the preliminary set of sensor data to generate the trained model, wherein the Gaussian process of the trained model defines the posterior distribution over the one or more functions.

In some embodiments, the method further comprises: performing, by a localization subsystem of the autonomous vehicle, a consistency check on the first set of sensor data; generating, by a perception subsystem of the autonomous vehicle, an internal map based upon the first set of sensor data, wherein the internal map is a three-dimensional map of the work-site environment; and generating, by a planning subsystem of the autonomous vehicle, a plan of action using the internal map and based upon a goal to be achieved by the autonomous vehicle, where the one or more operations of the autonomous vehicle are controlled in the worksite environment based on the plan action of action to achieve the goal.

In some embodiments, the controlling the one or more operations of the autonomous vehicle in the worksite environment using the first set of input data comprises: comparing, by the controller system, an actual path and/or a predicted path of the autonomous vehicle with an intended path to determine whether the vehicle behavior is unstable; when the vehicle behavior is unstable, calculating, by the controller system, the first set of input data to stabilize the autonomous vehicle and bring the autonomous vehicle back into the intended path; estimating, by the trained model, a third set of output data based on the first set of input data; determining, by the controller system, the first set of input data will stabilize the autonomous vehicle and bring the autonomous vehicle back into the intended path based on the estimation of the third set of output data; and generating, by the controller system, instruction for controlling the one or more operations of the autonomous vehicle in the worksite environment using the first set of input data.

In some embodiments, the independent variables include position or displacement of joy stick or accelerator, steering position or angle, position or displacement of brake, road elevation angle, air temperature, humidity or a combination thereof while the autonomous vehicle is in operation, and the dependent variables include the linear velocity, angular velocity, or a combination thereof while the autonomous vehicle is in operation.

In some embodiments, a system is provided that includes one or more data processors and a non-transitory computer readable storage medium containing instructions which, when executed on the one or more data processors, cause the one or more data processors to perform part or all of one or more methods or processes disclosed herein.

In some embodiments, a computer-program product is provided that is tangibly embodied in a non-transitory machine-readable storage medium and that includes instructions configured to cause one or more data processors to perform part or all of one or more methods disclosed herein.

Some embodiments of the present disclosure include a system including one or more data processors. In some embodiments, the system includes a non-transitory computer readable storage medium containing instructions which, when executed on the one or more data processors, cause the one or more data processors to perform part or all of one or more methods and/or part or all of one or more processes disclosed herein. Some embodiments of the present disclosure include a computer-program product tangibly embodied in a non-transitory machine-readable storage medium, including instructions configured to cause one or more data processors to perform part or all of one or more methods and/or part or all of one or more processes disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the claimed embodiments. Thus, it should be understood that although specific embodiments have been disclosed, other embodiments and optional features, modifications and variations of the concepts herein disclosed may be resorted to by those skilled in the art, and that such modifications and variations are considered to be within the scope as defined by the appended claims.

BRIEF DESCRIPTION OF THE DRAWINGS

The present disclosure can be best understood by reference to the following description taken in conjunction with the accompanying figures, in which like parts may be referred to by like numerals.

DETAILED DESCRIPTION

Figure 1A:
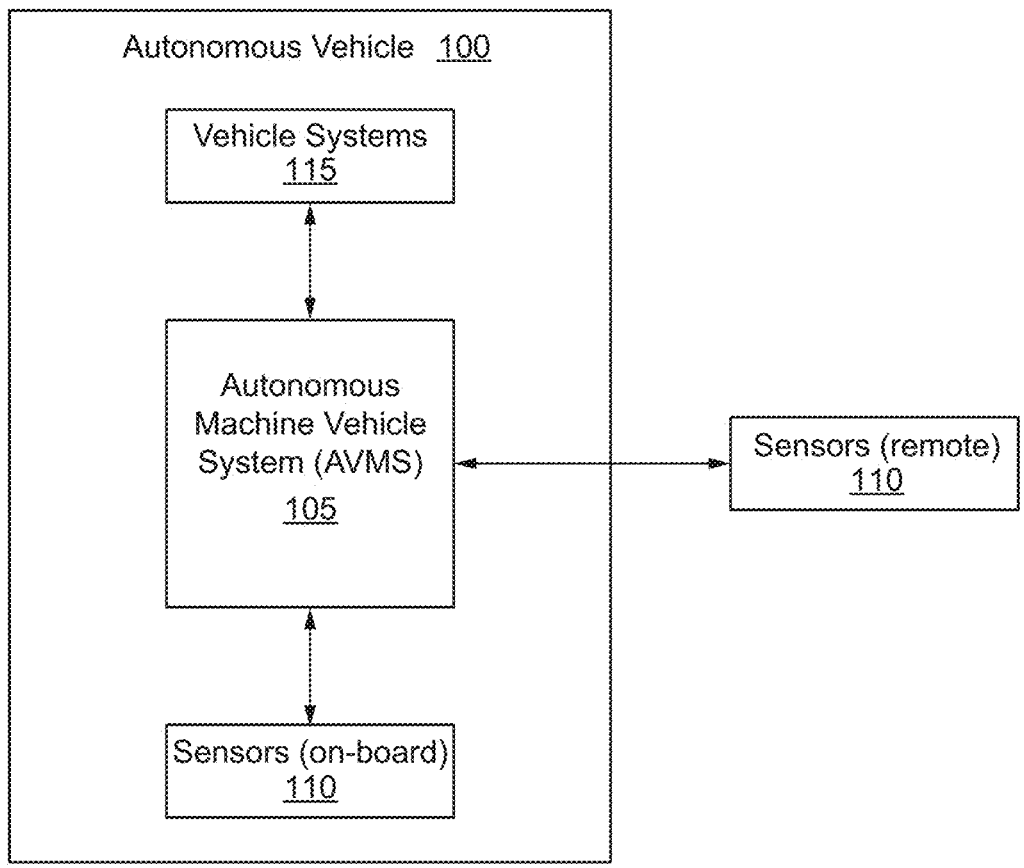
FIG. 1A is a high level simplified block diagram of an autonomous vehicle incorporating a controller system (referred to herein as an autonomous vehicle management system (AVMS)) according to various embodiments.

Exemplary examples and embodiments of the present disclosure will now be described in detail with reference to the drawings, which are provided as illustrative examples so as to enable those skilled in the art to practice the disclosure. Notably, the figures and examples below are not meant to limit the scope of the present disclosure to a single embodiment, but other embodiments are possible by way of interchanges of or combinations of some or all of the described or illustrated elements. Wherever convenient, the same reference numbers will be used throughout the drawings to refer to the same or similar parts. In the following description, for the purposes of explanation, specific details are set forth in order to provide a thorough understanding of certain inventive embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs. Where certain elements of these implementations can be partially or fully implemented using known components, only those portions of such known components that are necessary for an understanding of the present disclosure will be described, and detailed descriptions of other portions of such known components will be omitted so as not to obscure the disclosure.

The present disclosure relates generally to the autonomous operation of heavy equipment or vehicles to perform various tasks, and more particularly to techniques for the kinematic estimation and dynamic behavior estimation of autonomous heavy equipment or vehicles to improve performance of tasks such as navigation, digging and material performed by the autonomous heavy equipment or vehicles. Conventional heavy equipment or vehicles suffer from poor dynamic stability control due primarily to unstable or variable working surfaces. Due to the diverse and unstructured nature of work-site environments in construction and mining, it is hard to distinguish different surfaces e.g., paved, dirt, grass, gravel, etc., and the problem of dynamic stability control gets accentuated. In order to overcome these limitations and problems, an application and framework is disclosed herein that uses predictive modeling to estimate kinematic and dynamic behavior of an autonomous vehicle in various work-site environments (e.g., in diverse off-road conditions) applicable to various industries such as, construction, mining, manufacturing, warehousing, logistics, sorting, packaging, agriculture, etc. The estimated kinematic and dynamic behavior of the autonomous vehicle is then used to instruct the vehicle systems on how to control (e.g., accelerate, steer, brake, etc.) the autonomous vehicle to complete a plan of actions or task while avoiding instability in the work-site environment.

The present disclosure describes several embodiments in the context of an autonomous vehicle. The use of the term "vehicle" and description with respect to a vehicle is not intended to be limiting or restrictive. The teachings described herein can be used with and applied to any autonomous equipment, including autonomous vehicles and other types of autonomous machines (e.g., heavy equipment such as bull dozers and cranes) that are configured to perform one or more tasks or operations in an automated manner, and substantially free of any human intervention.

As used herein, the terms "substantially," "approximately" and "about" are defined as being largely but not necessarily wholly what is specified (and include wholly what is specified) as understood by one of ordinary skill in the art. In any disclosed embodiment, the term "substantially," "approximately," or "about" may be substituted with "within [a percentage] of" what is specified, where the percentage includes 0.1, 1, 5, and 10 percent. As used herein, when an action is "based on" something, this means the action is based at least in part on at least a part of the something.

FIG. 1A is a high level simplified block diagram of an autonomous vehicle 100 incorporating a controller system (referred to herein as autonomous vehicle management system (AVMS) 105) according to certain embodiments. For purposes of this disclosure, an autonomous vehicle, such as autonomous vehicle 100, is a vehicle that is capable of performing one or more operations autonomously and substantially free of any human user or manual input. For example, in certain embodiments, the autonomous operation may be the ability of the vehicle 100 to autonomously sense its environment and navigate or drive along a path autonomously and substantially free of any human user or manual input. Examples of other autonomous operations include, without limitation, scooping and dumping operations, moving materials or objects (e.g., moving dirt or sand from one area to another), lifting materials, driving, rolling, spreading dirt, excavating, transporting materials or objects from one point to another point, and the like.

Autonomous vehicle 100 can be of various different types. For example, autonomous vehicle 100 can be a car or mobile machine that can be used to transport people and/or cargo. Autonomous vehicle 100 can be a specialized vehicle for performing specialized operations such as road or path compacting, rolling, digging, lifting, etc. Examples of autonomous vehicle 100 include without restriction wagons, bicycles, motor vehicles (e.g., motorcycles, cars, trucks, buses), railed vehicles (e.g., trains, trams), watercrafts (e.g., ships, boats), aircrafts, spacecraft, and/or heavy equipment vehicles (e.g. dump trucks, tractors, bull dozers, excavators, forklifts, etc.). Since the environment of autonomous vehicle 100 can include other vehicles, including other autonomous vehicles, for purposes of clarity, in order to differentiate autonomous vehicle 100 from other vehicles in its environment, autonomous vehicle 100 is also sometimes referred to as the ego vehicle.

Various features have been described below using an autonomous vehicle as an example. However, this is not intended to be limiting. The teachings described herein can be applied to any machine that is capable of performing one or more autonomous operations. For example, the teachings can be used by a loader, a compactor, and the like. The machines may be used in various industries such manufacturing, mining, construction, medical applications, packaging, assembly, surveying, mapping technologies logistics, etc.

As depicted in FIG. 1A, in addition to autonomous vehicle management system 105, autonomous vehicle 100 may include or be coupled to sensors 110 and vehicle systems 115. Autonomous vehicle management system 105 may be communicatively coupled with sensors 110 and vehicle systems 115 via wired or wireless links. One or more different communication protocols may be used for facilitating communications between autonomous vehicle management system 105 and sensors 110 and between autonomous vehicle management system 105 and vehicle systems 115.

Vehicle systems 115 can include various electro-mechanical systems, components, linkages, etc. that enable autonomous vehicle 100 to perform its intended functions such as traveling or navigating along a particular path or course (e.g., navigating along a path over diverse off-road conditions). Vehicle systems 115 may include for example, a steering system, a throttle system, a braking system, a propulsion system, etc. for driving the autonomous vehicle, electrical systems, auxiliary systems (e.g., systems for outputting information to a driver or passenger of autonomous vehicle 100), and the like. Vehicle systems 115 can be used to set the path and speed of autonomous vehicle 100. In an autonomous vehicle that is configured to perform a specialized operation (e.g., a dump truck that is specialized to perform lift and dump operations, a tractor, etc.), the vehicle systems 115 may also include systems that are configured to perform such specialized operations.

Figure 3:
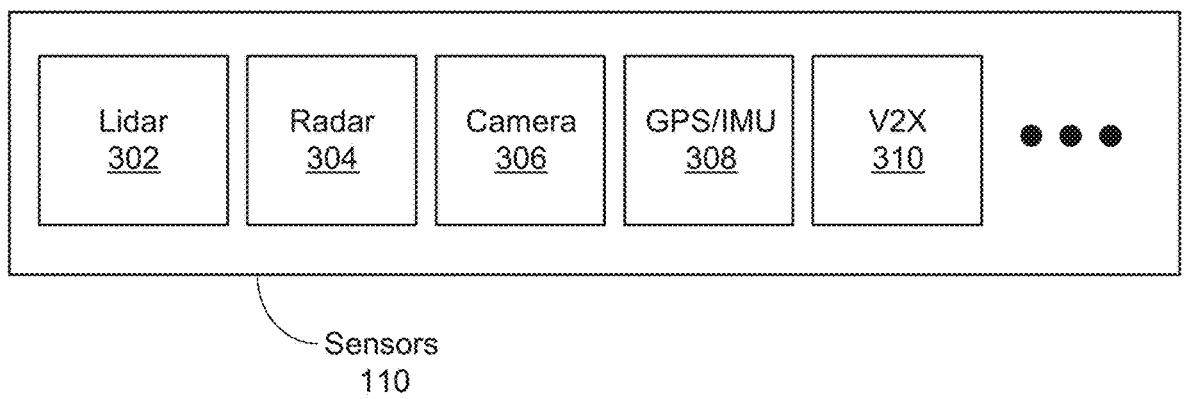
FIG. 3 illustrates an example set of sensors of an autonomous machine according to various embodiments.

Sensors 110 may be located on or in autonomous vehicle 100 ("onboard sensors") or may even be located remotely ("remote sensors") from autonomous vehicle 100. Autonomous vehicle management system 105 may be communicatively coupled with remote sensors via wireless links using a wireless communication protocol. Sensors 110 can obtain environmental information for autonomous vehicle 100 (e.g., sensors to capture real time data such as position/displacement of joy stick/accelerator, steering position/angle, position/displacement of brake, road elevation angle, air temperature, and humidity while the vehicle is in operation). This sensor data can then be fed to autonomous vehicle management system 105. FIG. 3 illustrates an example set of sensors 110 of an autonomous vehicle, including, without limitation, LIDAR (Light Detection and Ranging) sensors 302, radar 304, cameras 306 (different kinds of cameras with different sensing capabilities may be used), Global Positioning System (GPS) and Inertial Measurement Unit (IMU) sensors 308, Vehicle-to-everything (V2X) sensors 310, audio sensors, temperature and humidity sensors, and the like. Sensors 110 can obtain (e.g., sense, capture) environmental information for autonomous vehicle 100 and communicate the sensed or captured sensor data to autonomous vehicle management system 105 for processing. Other sensors may include proximity sensors, SONAR sensors, and other sensors.

Examples of radar sensors 304 (e.g., long range radar, short range radar, imaging radar etc.) may include sensors that are used to detect objects in the environment of autonomous vehicle 100 and to determine the velocities of the detected objects. Examples of LIDAR sensors 302 include sensors that use surveying techniques that measure distances to a target by using light in the form of a pulsed laser light. This is done by illuminating the target to be measured with pulsed laser light and measuring the reflected pulses using the sensor. Examples of V2X sensors include sensors that use V2X communication technology to communicate with moving parts of a traffic system. For example, autonomous vehicle 100 may use a V2X sensor for passing and/or receiving information from a vehicle to another entity around or near the autonomous vehicle. A V2X communication sensor/system may incorporate other more specific types of communication infrastructures such as V2I (Vehicle-to-Infrastructure), V2V (Vehicle-to-vehicle), V2P (Vehicle-to-Pedestrian), V2D (Vehicle-to-device), V2G (Vehicle-to-grid), and the like. An IMU sensor may be an electronic device that measures and reports a body's specific force, angular rate, and sometimes the magnetic field surrounding the body, using a combination of accelerometers, gyroscopes, magnetometers, etc. GPS sensors use a space-based satellite navigation system to determine geolocation and time information.

As will be described below, in certain embodiments, data obtained from different types of sensors or multiple instances of the same type of sensor may be combined or fused to form a three-dimensional (3D) representation of a path or road conditions or other objects of interest, from which representation one or more properties or features of the path/road or objects (e.g., the angle of incline, the material composition of the path/road, the path/road conditions such as snow covered, etc.) can be estimated. Various types of sensor combinations may be employed for the purpose of obtaining data for generating the 3D representation. Combining different sensor types has certain advantages. For example, cameras are capable of generating highly detailed images of the environment the path/road or objects are within it, whereas LIDAR and radar provide better depth perception. LIDAR is generally more accurate than radar when detecting stationary objects, whereas radar is more accurate at detecting moving objects.

Autonomous vehicle management system 105 (also referred to as a controller system) is configured to process data describing the state of autonomous vehicle 100 and the state of the autonomous vehicle's environment, and based upon the processing, control one or more autonomous functions or operations of autonomous vehicle 100. For example, autonomous vehicle management system 105 may issue instructions/commands to vehicle systems 115 to programmatically and autonomously control various aspects of the autonomous vehicle's motion such as the propulsion, braking, steering or navigation, and auxiliary behavior (e.g., turning lights on) functionality of autonomous vehicle 100. Autonomous vehicle management system 105 implements the control and planning algorithms that enable autonomous vehicle 100 to perform one or more operations autonomously.

Autonomous vehicle management system 105 may be implemented using software only, hardware only, or combinations thereof. The software may be stored on a non-transitory computer readable medium (e.g., on a memory device) and may be executed by one or more processors (e.g., by computer systems) to perform its functions. In the embodiment depicted in FIG. 1, autonomous vehicle management system 105 is shown as being in or on autonomous vehicle 100. This is however not intended to be limiting. In alternative embodiments, autonomous vehicle management system 105 can also be remote from autonomous vehicle 100.

Autonomous vehicle management system 105 receives sensor data from sensors 110 on a periodic or on-demand basis. Autonomous vehicle management system 105 uses the sensor data received from sensors 110 to perceive the autonomous vehicle's surroundings and environment. Autonomous vehicle management system 105 uses the sensor data received from sensors 110 to generate and keep updated a digital model that encapsulates information about the state of autonomous vehicle and of the space and environment surrounding autonomous vehicle 100. This digital model may be referred to as an internal map, which encapsulates the current state of autonomous vehicle 100 and its environment including path/road conditions. The internal map along with other information is then used by autonomous vehicle management system 105 to make decisions regarding actions (e.g., navigation, braking, acceleration, scooping, dumping, etc.) to be performed by autonomous vehicle 100. Autonomous vehicle management system 105 may send instructions or commands to vehicle systems 115 to cause the actions be performed by the systems of vehicles systems 115.

Figure 1B:
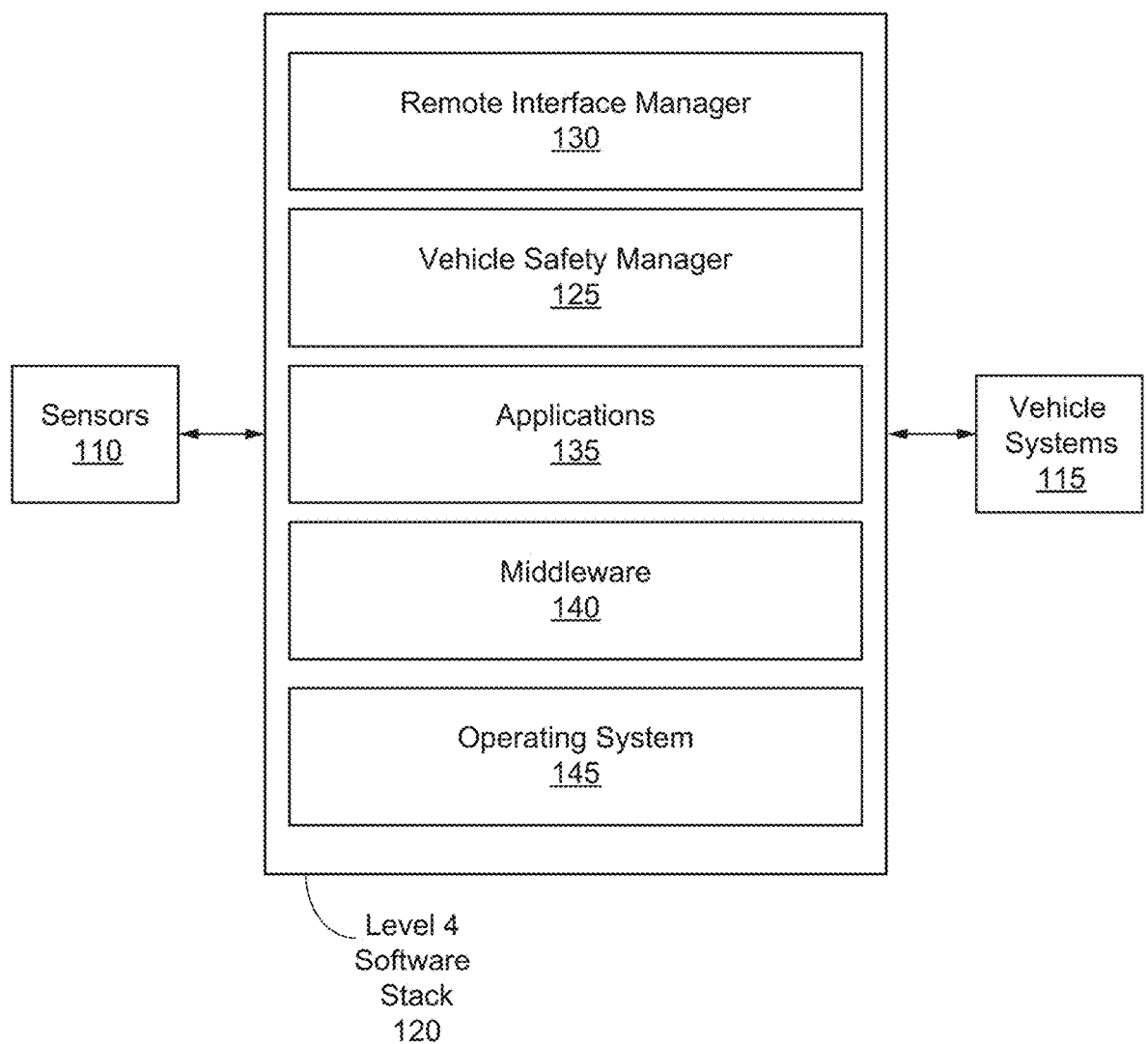
FIG. 1B depicts an example autonomous vehicle management system implemented primarily in software, according to various embodiments.

As indicated above, autonomous vehicle management system 105 may be implemented using software only, hardware only, or combinations thereof. FIG. 1B depicts an example autonomous vehicle management system wherein autonomous vehicle management system 105 is implemented primarily in software, according to some embodiments. Autonomous vehicle management system 105 may be implemented as a fully autonomous vehicle software stack 120. Fully autonomous vehicle software stack 120 can include a vehicle safety manager 125, a remote interface manager 130, applications 135, middleware 140, and operating system 145. Fully autonomous vehicle software stack 120 may be used to implement the functionalities of the various systems and subsystems described above.

Figure 2A:
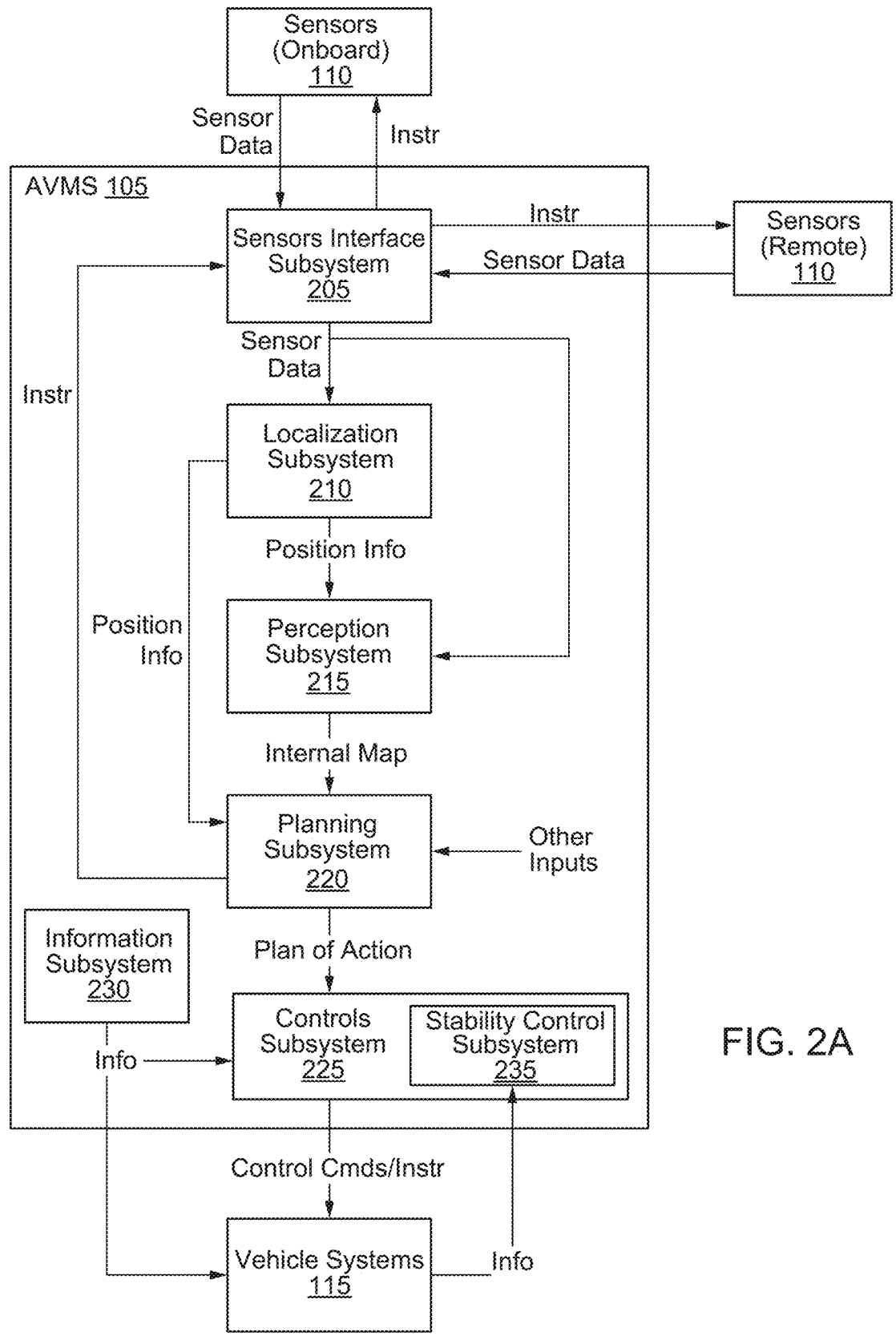
FIG. 2A is a simplified block diagram depicting subsystems of an autonomous vehicle management system according to various embodiments.

FIG. 2A is a simplified block diagram depicting subsystems of autonomous vehicle management system 105 according to certain embodiments. Autonomous vehicle management system 105 may comprise multiple systems or subsystems communicatively coupled to each other via one or more communication channels. In the embodiment depicted in FIG. 2A, the subsystems include a sensors interface subsystem 205, a localization subsystem 210, a perception subsystem 215, a planning subsystem 220, a controls subsystem 225, and an information subsystem 230.

Autonomous vehicle management system 105 embodiment depicted in FIG. 2A is merely an example and is not intended to unduly limit the scope of claimed embodiments. One of ordinary skill in the art would recognize many possible variations, alternatives, and modifications. For example, in some implementations, autonomous vehicle management system 200 may have more or fewer subsystems or components than those shown in FIG. 2A, may combine two or more subsystems, or may have a different configuration or arrangement of subsystems. The subsystems may be implemented using software only, hardware only, or combinations thereof. In the embodiment depicted in FIG. 2A, autonomous vehicle management system 105 and all its subsystems are shown as being in or on autonomous vehicle 100. This is however not intended to be limiting. In alternative embodiments, all the subsystems of autonomous vehicle management system 105 or certain subsystems of autonomous vehicle management system 105 can also be remote from autonomous vehicle 100.

Sensors interface subsystem 210 provides an interface that enables communications between sensors 110 (including on-board sensors and remote sensors) and autonomous vehicle management system 105. Sensors interface subsystem 210 may receive sensor data from sensors 110 and provide the data to one or more other subsystems of autonomous vehicle management system 105. For example, as depicted in FIG. 2A, sensor data may be provided to localization subsystem 210 and perception subsystem 215 for further processing. The sensor data collected by the various sensors 110 enables autonomous vehicle management system 105 to construct a view or picture of autonomous vehicle 100 and its surrounding environment including path/road conditions.

In certain embodiments, autonomous vehicle management system 105 enables one or more subsystems of autonomous vehicle management system 105 to send instructions or commands to one or more sensors 110 to control the operations of the one or more sensors. For example, instructions may be sent to a particular sensor to change the behavior of the particular sensor. For example, instructions may be sent to a sensor to change the information sensed or collected by the sensor and/or to change the sensor data communicated from the sensor to autonomous vehicle management system 122. Using these instructions, autonomous vehicle management system 122 can dynamically control the sensor data that is communicated from sensors 110 to autonomous vehicle management system 122. Further details on this are provided below in the context of functions performed by planning subsystem 206.

Localization subsystem 202 is configured to receive sensor data from sensors 110, and based upon the sensor data, identify the location of autonomous vehicle 120 in its surrounding environment (vehicle localization). Localization subsystem 202 provides current, local position information of the ego vehicle with respect to its environment (example: mine). The position of the ego vehicle 120 may be determined with respect to a pre-defined map that is generated by perception subsystem 204. In certain embodiments, localization subsystem 202 is configured to broadcast the ego vehicle's position information to other systems or subsystems of autonomous vehicle 120. The other systems or subsystems may then use the position information as needed for their own processing.

Localization subsystem 202 may implement various functions such as internal map management, map matching, visual odometry, dead reckoning, location history management, and the like. For example, assume that autonomous vehicle 120 is driving in a mine. Localization subsystem 202 may receive as input a map of the mine. A mine usually has a set path comprising drivable with varied terrain and non-drivable areas and a set road for mining vehicles to follow around a mine. Localization subsystem 210 may determine the position of the ego vehicle along the path. Localization subsystem 210 may do so by utilizing multiple inputs it receives from sensors and maps of the environment including path/road conditions. Localization subsystem 210 may use GPS sensor data to determine the global positioning of the ego vehicle. Localization subsystem 210 may receive the GPS sensor data and translate it to a more useful form that is usable by one or more other subsystems of autonomous vehicle management system 105. For example, information, localization subsystem 210 may identify where the ego vehicle is positioned with respect to a map of the environment, such as a mine map (also referred to as map management).

Localization subsystem 210 may also be configured to perform map matching, where what localization subsystem 210 perceives is matched with the information (e.g., ground truths) that localization subsystem 210 has previously acquired. Map matching can match recorded geographic coordinates to a logical model of the real world, (e.g., using a Geographic Information System (GPS), etc.). In one example, a map matching algorithm can obtain a recorded, serial location points (e.g. from GPS) and relate them to edges in an existing street graph (e.g., as a network). This can be in a sorted list representing the travel of an autonomous vehicle. As part of map matching, localization subsystem 210 is tracking the ego vehicle in its environment and deducing its position based on what localization subsystem 210 sees relative to a map, such as a real world map.

Localization subsystem 210 is also configured to perform visual odometry, which involves determining the orientation and position of the ego vehicle based upon sensor data, such as by analyzing images captured by one or more cameras.

Localization subsystem 210 may also perform dead reckoning processing. Dead reckoning is the process of calculating one's current position by using a previously determined position, or fix, and advancing that position based upon known or estimated speeds over elapsed time and course. This may involve calculating the ego vehicle's position by estimating the direction and distance travelled. For example, autonomous vehicle management system 105 receives and knows certain information about autonomous vehicle 100 such as its wheel speed, steering angle, where autonomous vehicle 100 was a second ago, and the like. Based on the past position information and in combination with speed/steering angle etc., localization subsystem 210 can determine the vehicle's next location or current location. This provides local understanding of the ego vehicle's position as it moves on its path. A path can be a road, highway, rail system, runway, boat route, bike path, etc., according to various embodiments.

Localization subsystem 210 may also perform local history management tracking, where historical information about the ego vehicle's path is analyzed and compared to the current path. For example, if autonomous vehicle 210 drives around a certain path in a mine many number of times, this information can be compared and analyzed by localization subsystem 210.

Localization subsystem 210 may also implement a consistency module that is configured to perform rationality checks, deficiency checks, normalize sensor data, etc. For example, localization subsystem 210 may receive information from different sources of information regarding the ego vehicle's position, location, etc. A rationality check may be used to do a validity check to make sure information from various sensors is consistent and robust. This helps reduce erroneous results. The rationality check can include tests to evaluate whether a sensor data value and/or the result of a calculation can possibly be true. The sensor data received from sensors 110 can also be normalized and the normalized sensor data then provided to localization subsystem 210. Localization subsystem 210 can then utilize the normalized sensor data to generate and/or update the consistent internal map of the real-time (e.g., assuming networking and processing latencies, etc.) environment of the autonomous vehicle.

Perception subsystem 215, periodically or on-demand, receives sensor data from sensors 110 and builds and maintains a consistent internal map based upon the received information. Perception subsystem 215 may also receive inputs from other sources, such as from localization subsystem 210, and use the received inputs to build and maintain the internal map. The internal map generated by perception subsystem 215 contains all the information including the ego vehicle's information, state of the ego vehicle and its environment, information about the path or road conditions, information about objects in the ego vehicle's environment (e.g., information regarding dynamic and static objects around ego vehicle). Consistent internal map can be a localized map of sensed entities/objects in the autonomous vehicle's environment, for example, around the autonomous vehicle. In certain embodiments, these sensed entities/objects are mapped in three dimensions (3D). In certain embodiments, perception subsystem 215 receives position information from localization subsystem 210 and incorporates the position information in the internal map. The internal map can be maintained even in the event that a sensor falls offline.

Rationality checks and normalization may be performed on the sensor data received by perception subsystem 215. These checks can include tests to evaluate whether a sensor data value and/or the result of a calculation can possibly be true. The sensor data received from sensors 110 can also be normalized and the normalized sensor data then provided to perception subsystem 215. Perception subsystem 215 can then utilize the normalized sensor data to generate and/or update the consistent internal map of the real-time environment of the autonomous vehicle.

Perception subsystem 215 may use various different algorithms and techniques to perform its functions, including artificial intelligence (AI) and machine learning based techniques. For example, perception subsystem 215 may use a convolutional neural network (CNN) to perform object detection and object classification based upon the sensor data. During a training phase, the CNN may be trained using labeled training data comprising sample images of a vehicle's environment and corresponding ground truth classifications. Labeled data generally includes a group of samples that have been tagged with one or more labels, where the labels represent known results (e.g., ground truth classification, etc.) for the training input samples. Labeling can also be used to take a set of unlabeled data and augment each piece of that unlabeled data with meaningful tags that are informative. A CNN model or other AI/machine learning model built based upon training may then be used in real time to identify and classify objects in the environment of autonomous vehicle 100 based upon new sensor data received from sensors 110.

Planning subsystem 220 is configured to generate a plan of action for autonomous vehicle 100. The plan may comprise one or more planned actions or operations to be performed by autonomous vehicle 100. For example, the plan may comprise information identifying a trajectory or path to be traversed by autonomous vehicle 100. A path can be a road, highway, rail system, runway, boat route, bike path, etc., according to various embodiments. For example, the trajectory information may indicate how the vehicle should move from point A to point B with a list of points between point A point B marking a trajectory for the vehicle to follow from point A to point B. As another example, the plan generated by planning subsystem 220 may include planned actions with respect to accessories of autonomous vehicle 100, such as turning indicators or lights on or off, producing one or more sounds (e.g., alarms), and the like. In situations where autonomous vehicle 100 has specialized components that are customized to perform specialized operations, the plan generated by planning subsystem 220 may also include planned actions to be performed by one or more of these specialized components. For example, if the autonomous vehicle is a digging truck with a bucket and arm assembly for performing the digging and moving of materials, the plan generated by planning subsystem 220 can include actions to be performed by the bucket and arm assembly for performing the digging. For example, the plan may include an angle at which the arm should be raised and or the angle of the bucket with respect to the arm. After a plan of action has been generated, planning subsystem 220 may communicate the plan of action to controls subsystem 225, which may then control one or more systems of vehicle systems 115 to cause the planned actions in the plan of action to be performed in a safe manner by autonomous vehicle 100.

In addition to the internal map generated by perception subsystem 215, planning subsystem 220 may also receive various other inputs that it uses in generating the plan of action for autonomous vehicle 100. These inputs may include, without limitation: (a) Position or localization information received from localization subsystem 210. (b) Information identifying one or more goals of autonomous vehicle 100 (e.g., information may be received identifying a final goal of autonomous vehicle 100 to make a right turn). The goal may be set by an end user or operator of the autonomous vehicle or machine. For an automotive example, the user may set a high level to drive from the current location of autonomous vehicle 100 to a particular final destination. Autonomous vehicle 100 may determine a GPS route plan based upon the current and final destination locations and with a goal to autonomously drive from the current location to the final destination according to the GPS route plan. In a mining environment example, a high level goal set by an operator may be to move ten tons of material (e.g., sand, coal, etc.) from point A over various terrain and dump the material at point B. In general, one or more different goals may be provided. Examples of categories of goals (some of which may overlap) include, without limitation: goals related to performing an autonomous operation by the autonomous vehicle (e.g., autonomous driving or navigation along a path, scooping and dumping operations, moving materials or objects, lifting materials, driving, rolling, spreading dirt, excavating, transporting materials or objects from one point to another point, etc.), goals related to maneuvering the vehicle taking into consideration terrain or path conditions, goals related to interaction of the vehicle with various actors, objects, etc. in the vehicle's environment, goals related to the general operations of the vehicles, and the like. Examples of goals: changing lanes, driving from one location to another location, driving to a destination as fast as possible, making a turn, performing a series of steps in a sequence, and others. (c) High level route information regarding the path or route to be taken by autonomous vehicle 100. This may be provided directly or indirectly by an end user or operator of the autonomous vehicle. (d) Information identifying safety considerations. These may also be provided to the autonomous vehicle by an end user/operator, etc. using APIs provided by autonomous vehicle 100 or via metadata configured for autonomous vehicle 100. Examples of these considerations include, without limitation: always stay within the lane, maintain certain distance from any object at all time, a dump truck is not to make more than a 30 degree turn, a loader B is not to climb over a predetermined grade more than 15 degrees, etc. (e) Information about how a particular operation was performed in the past. For example, for a particular autonomous vehicle, this could be the past history of how that particular autonomous vehicle performed the operation in the past, how a different autonomous vehicle performed the operation in the past, how the operation was manually performed using a vehicle in the past (e.g., how a driver/operator performed the operation in the past with the vehicle operating under the driver/operator's control). For example, the autonomous vehicle traveled a path in the past, how a manual truck would have driven this path or completed a certain task, and the like. (f) Other inputs.

Based upon the one or more inputs, planning subsystem 220 generates a plan of action for autonomous vehicle 100. Planning subsystem 220 may update the plan on a periodic basis as the environment of autonomous vehicle 120 changes (e.g., as the conditions of the path or road change), as the goals to be performed by autonomous vehicle 100 change, or in general, responsive to changes in any of the inputs to planning subsystem 220.

As part of generating and updating the plan of action, planning subsystem 220 makes various decisions regarding which actions to include in the plan in order to achieve a particular goal in a safe manner. Processing performed by planning subsystem 220 as part of making these decisions may include behavior planning, global planning, path planning, fail-safe path, path history tracking, etc.

Planning subsystem 220 may use various AI-based machine-learning algorithms to generate and update the plan of action in order to achieve the goal of performing a function or operation (e.g., autonomous driving or navigation, digging of an area) to be performed by autonomous vehicle 100 in a safe manner. For example, in certain embodiments, planning subsystem 220 may use a model trained using reinforcement learning (RL) for generating and updating the plan of action. Autonomous vehicle management system 105 may use an RL model to select actions to be performed for controlling an autonomous operation of autonomous vehicle 100. The RL model may be periodically updated to increase its coverage and accuracy. Reinforcement learning (RL) is an area of machine learning inspired by behaviorist psychology, concerned with how agents ought to take actions in an environment so as to maximize some notion of cumulative reward.

In certain embodiments, in addition to generating a plan of action, planning subsystem 220 is capable of dynamically controlling the behavior of sensors 110. For example, planning subsystem 220 can send instructions or commands to a particular sensor from sensors 110 to dynamically control the sensor data that is captured by the particular sensor and/or control the sensor data that is communicated from the sensor to perception subsystem 215 (or to other subsystems of autonomous vehicle management system 105, such as to localization subsystem 210). Since the internal map built by perception subsystem 215 is based upon the sensor data received by perception subsystem 215 from the sensors, by being able to dynamically control the sensor data received from the sensors, the information included in and/or used by perception subsystem 215 to build and maintain the internal map can also be dynamically controlled by planning subsystem 220. Planning subsystem 220 can dynamically and on-demand direct sensors 110 to obtain specific types of information or behave in specified manners, for example, to provide additional sensor data to update the consistent internal map. For example, planning subsystem 220 can command a LIDAR sensor to narrow its range of sensing from a three-hundred and sixty-degree (360°) view to a narrower range that includes a specific object to be sensed and/or tracked in greater detail by the LIDAR system. In this way, the consistent internal map is updated based on feedback from and under the control of planning subsystem 220.

Autonomous vehicle management system 105 provides an infrastructure that enables planning subsystem 220 (or other subsystems of autonomous vehicle management system 105) to send one or more instructions or commands to one or more sensors to control the behavior of those one or more sensors. In the embodiment depicted in FIG. 2A, sensors interface subsystem 205 provides an interface for interacting with sensors 110. In the outbound direction (from autonomous vehicle management system 105 to the sensors direction), planning subsystem 220 can send an instruction or command to sensors interface subsystem 205. Sensors interface subsystem 205 is then configured to communicate the received instruction to the intended destination sensor. In the inbound direction (from a sensor to autonomous vehicle management system 105), sensors interface subsystem 205 may receive sensor data from a sensor in response to the instruction sent from planning subsystem 220. Sensors interface subsystem 210 may then communicate the received sensor data to planning subsystem 220 (or to the appropriate subsystem of autonomous vehicle management system 105 which originated the instruction).

Sensors interface subsystem 205 may be capable of communicating with different sensors using one or more different communication protocols. In certain embodiments, in the outbound direction, for an instruction or command received from planning subsystem 220 (or from any other subsystem of autonomous vehicle management system 105) and to be sent to a particular sensor, sensors interface subsystem 205 may translate the instruction to a format that is understandable by and appropriate for communicating with that particular sensor and then use a particular communication protocol that is applicable for that particular sensor.

In certain embodiments, autonomous vehicle management system 105 may have access to information identifying sensors 110 and their capabilities. The subsystems of autonomous vehicle management system 105 may then access and use this stored information to determine the possible capabilities and behaviors of a sensor and to send instructions to that sensor to change its behavior. In certain embodiments, a sensor has to be registered with autonomous vehicle management system 105 before communications are enabled between the sensor and autonomous vehicle management system 105. As part of the registration process, for a sensor being registered, information related to the sensor may be provided. This information may include information identifying the sensor, the sensor's sensing capabilities and behaviors, communication protocol(s) usable by the sensor, and other information related to the sensor. Autonomous vehicle management system 105 may then use this information to communicate with and control the behavior of the sensor.

As indicated above, planning subsystem 220 may send instructions to a sensor to control and change the sensor's behavior. Changes in a sensor's behavior can include changing the sensor data that is communicated from the sensor to autonomous vehicle management system 105 (e.g. the sensor data communicated from the sensor to perception subsystem 215, or other subsystems of autonomous vehicle management system 105), changing the data that is collected or sensed by the sensor, or combinations thereof. For example, changing the sensor data that is communicated from the sensor to autonomous vehicle management system 105 can include communicating more or less data than what was communicated from the sensor to autonomous vehicle management system 105 prior to receiving the instruction, and/or changing the type of sensor data that is communicated from the sensor to autonomous vehicle management system 105. In some instances, the data sensed or collected by the sensor may remain the same but the sensor data communicated from the sensor to autonomous vehicle management system 105 may change. In other instances, the data sensed or collected by the sensor may itself be changed in response to an instruction received from autonomous vehicle management system 105. Planning subsystem 220 may also be able to turn a sensor on or off by sending appropriate instructions to the sensor.

For example, planning subsystem 220 may receive inputs including a current internal map generated by perception subsystem 215, position information from localization subsystem 210, and a goal that autonomous vehicle 100 is to make a turn in a certain amount of time (e.g., a right turn in the next 5 seconds). As part of deciding what is the best set of actions to be taken by autonomous vehicle 100 to achieve the goal in a safe manner, planning subsystem 220 may determine that it needs particular sensor data (e.g., additional images) showing path or road conditions and the environment on the right side of autonomous vehicle 100. Planning subsystem 220 may then determine the one or more sensors (e.g., cameras) that are capable of providing the particular sensor data (e.g., images of the environment on the right side of autonomous vehicle 100). Planning subsystem 220 may then send instructions to these one or more sensors to cause them to change their behavior such that the one or more sensors capture and communicate the particular sensor data to autonomous vehicle management system 105 (e.g., to perception subsystem 215). Perception subsystem 215 may use this specific sensor data to update the internal map. The updated internal map may then be used by planning subsystem 220 to make decisions regarding the appropriate actions to be included in the plan of action for autonomous vehicle 100. After the right turn has been successfully made by autonomous vehicle 100, planning subsystem 220 may send another instruction instructing the same camera(s) to go back to communicating a different, possibly reduced, level of sensor data to autonomous vehicle management system 105. In this manner, the sensor data that is used to build the internal map can be dynamically changed.

Examples of changes in a sensor's behavior caused by an instruction received by the sensor from autonomous vehicle management system 105 may include, without limitation: causing a sensor to reduce, or even shut off, sensor data that is communicated from the sensor to autonomous vehicle management system 105. This may be done, for example, to reduce the high volume of sensor data received by autonomous vehicle management system 105. Using the same example from above, where planning subsystem 220 receives an input indicating that a goal of the autonomous vehicle 100 is to make a right turn, planning subsystem 220 may decide that it requires reduced sensor data with respect to the left environment of autonomous vehicle 100. Planning subsystem 220 may then determine the one or more sensors (e.g., cameras) that are responsible for communicating the sensor data that is to be reduced. Planning subsystem 220 may then send instructions to these one or more sensors to cause them to change their behavior such that the amount of sensor data communicated from these sensors to autonomous vehicle management system 105 (e.g., to perception subsystem 215) is reduced. As an example, the instructions sent from the planning subsystem 220 may do one or more of the following: (i) cause a sensor to change its field of view. For example, causing a camera or a LIDAR sensor to zoom in to a narrow location, (ii) cause a sensor to only send partial information. For example, the sensor may send less than all the information captured by the sensor, (iii) cause a sensor to send information faster or slower than before or than a regular rate, (iv) cause a sensor to turn on, or (v) cause a sensor to capture and/or send information to autonomous vehicle management system 122 at a different resolution or granularity then before.

As indicated above, planning subsystem 220 may send the plan of action or instructions for executing the plan of action to controls subsystem 225. The controls subsystem 225 may issue instructions/commands to vehicle systems 115 to programmatically and autonomously control various aspects of the autonomous vehicle's motion such as the propulsion, braking, steering or navigation, and auxiliary behavior (e.g., turning lights on) functionality of autonomous vehicle 100. The controls subsystem 225 implements the control and planning algorithms that enable autonomous vehicle 100 to perform one or more operations defined in the plan of action autonomously. In some instances, the controls subsystem 225 utilizes a stability control subsystem 235 to estimate kinematics and dynamic behavior of the autonomous vehicle 100 to improve (e.g., avoid instability) various actions or tasks such as navigation, digging, and material carrying in various work-site environments (e.g., in diverse off-road conditions). The stability control subsystem 235 may utilize predictive modeling to estimate kinematics and dynamic behavior of the autonomous vehicle 100 in the various work-site environments. The estimated kinematic and dynamic behavior of the autonomous vehicle 100 is then used to instruct the vehicle systems 115 on how to control (e.g., accelerate, steer, brake, etc.) the autonomous vehicle 100 to complete a plan of actions or task while avoiding instability in a work-site environment.

In some instances, the autonomous vehicle 100 may be first operated manually or remote control within a work-site environment for a predetermined amount of time (e.g., 20-30 minutes) to collect data from the sensor 110 pertaining to the work-site environment. Thereafter, in an training process (online or offline), a predictive model may be trained and fit using the collected data (e.g., input and actual performance of the vehicle within the work-site environment). Once the predictive model training and fitting is tested and/or validated, the trained predictive model specific to the work-site environment may be deployed for vehicle control in full autonomous operations within the work-site environment. The trained predictive model may be stored in the information subsystem 230 for use by the stability control subsystem 235 for vehicle control. Thereafter, the autonomous vehicle 100 may be deployed within the work-site environment for full autonomous operations. During the autonomous operations (e.g., completion of tasks from planning subsystem 220), the trained predictive model is continuously updated on real time basis to continually improve control and avoid instability.

In other instances, the autonomous vehicle 100 may be loaded with a baseline model fitted on data collected on an environment similar to the actual operational site (e.g., the work-site environment). The baseline model may be stored in the information subsystem 230 for use by the stability control subsystem 235 for vehicle control. Initially, the autonomous vehicle 100 is operated in autonomous mode in a safe zone of the work-site environment using the baseline model prior to full deployment. Data is collected (e.g., input and actual performance of the vehicle within the work-site environment) by the sensors 110 during the safe zone operation and used to update the baseline model on a real time basis during the safe zone operation. As such, the baseline model now becomes trained on actual conditions of the work-site environment. The trained predictive model may be updated and/or stored in the information subsystem 230 for use by the stability control subsystem 235 for vehicle control. Thereafter, the autonomous vehicle 100 may be deployed within the work-site environment for full autonomous operations. During the autonomous operations (e.g., completion tasks from planning subsystem 220), the trained predictive model is continuously updated on real time basis to continually improve control and avoid instability.

Using the same example from above, where planning subsystem 220 receives an input indicating that a goal of the autonomous vehicle 100 is to make a right turn, planning subsystem 220 may obtain real time data (e.g., position of the joy stick control or other controls such as accelerator, steering angle, brakes etc. and other situational and environment related variables) from the sensors 110 while the vehicle is in operation, and the stability control subsystem 235 may use that real time data to estimate kinematics and dynamic behavior of the autonomous vehicle 100 in a given or determined work-site environment based on the trained predictive model for the given or determined work-site environment. The controls subsystem 225 may use the estimated kinematics and dynamic behavior of the autonomous vehicle 100 to generate commands or instructions for the vehicle systems 115 to operate the autonomous vehicle in a manner specific to execute the right turn in the work-site environment while avoiding instability (e.g., toppling over or skidding out of the turn). As should be understood, different trained predictive models may be used for estimating kinematics and dynamic behavior of the autonomous vehicle 100 depending on the type of autonomous vehicle being operated and/or the work-site environment.

Figure 2B:
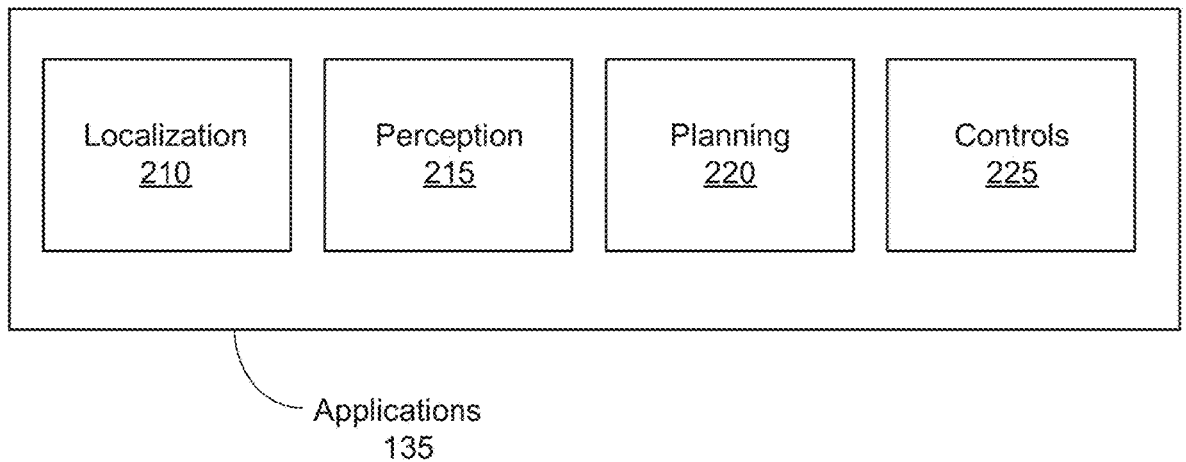
FIG. 2B illustrates software modules (e.g., program, code, or instructions executable by one or more processors of an autonomous machine) that may be used to implement the various subsystems of an autonomous vehicle management system according to various embodiments.

One or more embodiments described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines. FIG. 2B illustrates modules, engines, or components (e.g., program, code, or instructions executable by one or more processors of autonomous vehicle 100) that may be used to implement the various subsystems of autonomous vehicle management system 105 according to certain embodiments. The modules, engines, or components may be stored on a non-transitory computer medium. As needed, one or more of the modules, engines, or components may be loaded into system memory (e.g., RAM) and executed by one or more processors of autonomous vehicle 100. In the example depicted in FIG. 2B, modules, engines, or components are shown for implementing localization subsystem 210, perception subsystem 215, planning subsystem 220, and controls subsystem 225.

Figure 4:
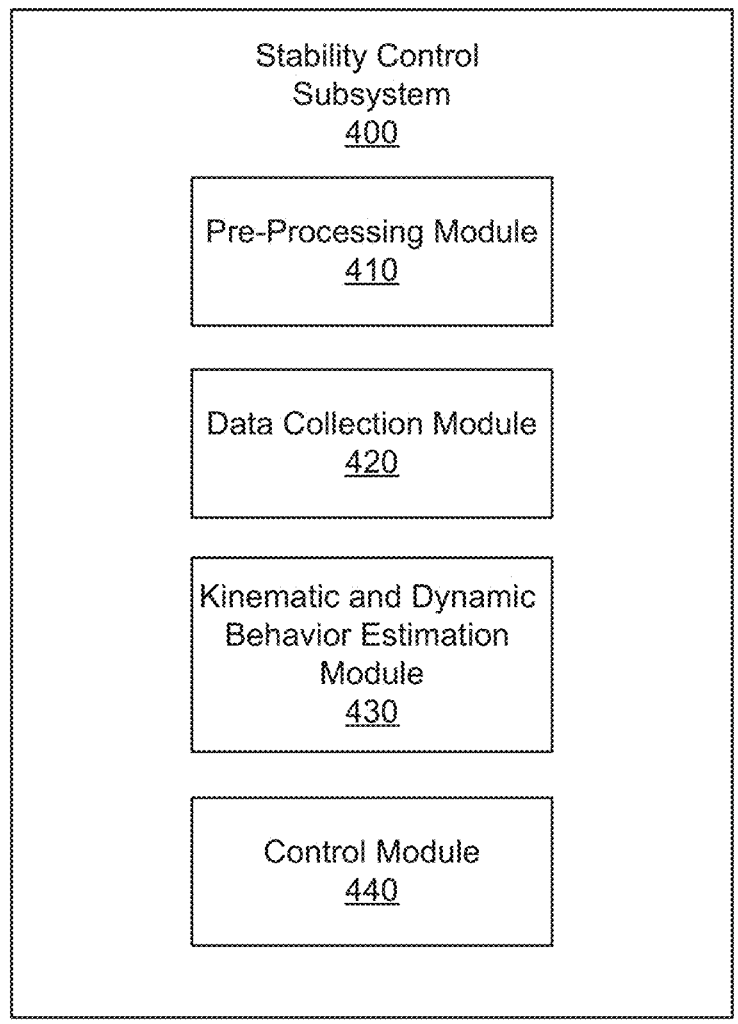
FIG. 4 is a simplified block diagram of a stability control subsystem in an autonomous vehicle according to various embodiments.

FIG. 4 is a simplified block diagram of a stability control subsystem 400 (e.g., stability control subsystem 235 described with respect to FIG. 2A) in an autonomous vehicle according to certain embodiments. As depicted in FIG. 4, the stability control subsystem 400 may include a pre-processing module 410, a data collection module 420, a kinematic and dynamic behavior estimation module 430, and a stability control module 425. Each of the modules 410, 420, 430, and 440 can be implemented in software, hardware, or a combination thereof. The stability control subsystem 400 depicted in FIG. 4 is merely an example. One of ordinary skill in the art would recognize many possible variations, alternatives, and modifications. For example, in some implementations, stability control subsystem 400 may have more or fewer subsystems or components than those shown in FIG. 4, may combine two or more subsystems, or may have a different configuration or arrangement of subsystems. Further, certain components of the stability control subsystem 400 have been intentionally omitted so as not to obscure the description of aspects of the stability control subsystem which relate to stability control of an autonomous vehicle.

Pre-processing module 410 is configured to condition and/or reformat obtained sensor data in preparation for further processing by the data collection module 420 and an kinematic and dynamic behavior estimation module 430. Formatting may involve transforming data produced by a first sensor and data produced by a second sensor into a shared format and/or shared frame of reference. For example, sensors may capture data at different rates (e.g., two cameras capturing data at different frames per second, or a radar sensor operating at a different frequency than a LIDAR sensor). Thus, as part of the processing performed by the pre-processing module 410, data captured from sensors operating at different rates may be reformatted so as to enable the sensor data to subsequently be combined in a coherent manner, e.g., merging or grouping together of data captured by different sensors but corresponding to the same time period. As another example, sensors may be located at different places (e.g., different locations of the autonomous vehicle such as the brake and the accelerator) and/or oriented differently (e.g., two cameras pointed in slightly different directions for generating stereoscopic images). If a first sensor captures a displacement of a joy stick equivalent to a perceived speed for the vehicle and a second sensor captures a calculated speed of the vehicle from the speedometer (e.g., due to a difference in the perspective of the second sensor relative to the first sensor), pre-processing module 510 may perform a normalization or correction to ensure that the speed of the vehicle is represented in the sensor data from both sensors as a single speed and not two separate speeds.

Conditioning of sensor data may involve any number of operations that improve the quality of the sensor data. The conditioning may vary depending on the type of sensor. For example, camera pre-processing may involve image size or resolution adjustments (e.g., to scale down a large image to a smaller size for faster downstream processing) and corrective image processing (e.g., lens correction, aberration correction, white balancing, aperture correction, and the like). Camera pre-processing may also involve combining different images into a single image (e.g., as an average of a set of images). Other types of conditioning operations include operations to eliminate noise or unneeded information (e.g., cropping of images, eliminating LIDAR data captured outside of a certain field of view, removing data corresponding to objects or regions that are not of interest (e.g., the ground), etc.).

Pre-processing module 410 may also be configured to perform calibration of sensors to change the sensor behavior and/or to compensate for non-ideal sensor behavior. Examples of changing the behavior of a LIDAR or radar sensor include adjusting a reflectivity parameter to change the operating range of the LIDAR/radar sensor (e.g., to prevent capturing of data beyond a certain distance when a section of a path of interest, such as incline or slope, is known to be less than that distance away from the vehicle) and changing the field of view captured by the LIDAR/radar sensor (e.g., from 360 degrees to 270 degrees). An example of a corrective camera calibration is the estimation of parameters for a lens and/or image sensor in a camera to enable the estimated parameters to be used to correct for lens distortion during subsequent image capture. Thus, pre-processing can involve operations performed prior to capturing sensor data as well as post-capture operations. Calibration can include intrinsic calibrations (e.g., adjusting the behavior of a sensor based on data captured by the same sensor) and/or extrinsic calibrations (e.g., adjusting the behavior of a sensor based on data from another sensor).

In certain embodiments, calibration of a camera involves calculating an extrinsic matrix for the camera. The extrinsic matrix represents the camera's pose and is a transformation matrix comprising values indicating a geometric transformation (e.g., translation and/or rotation) needed to map the camera's frame of reference to some other frame of reference (e.g., the reference frame of a LIDAR sensor or a thermal mapping of a thermal sensor). The extrinsic matrix can be calculated as a 3×4 matrix using a checkerboard calibration technique, in which a 3D calibration rig featuring a checkerboard pattern is placed within view of the camera and then captured to determine matrix parameters that map a point or feature in the checkerboard image to a corresponding point or feature in the other frame of reference. For example, a corner of the calibration rig as represented in the checkerboard image can be mapped to a corner of the calibration rig as represented in a point cloud generated by a LIDAR sensor. The calculation of the extrinsic matrix can be performed as a one-time setup involving the use of a perspective-n-point (PnP) algorithm that estimates the camera pose given a set of n number of 3D points and their corresponding two-dimensional (2D) projections in a camera image. Once calculated, the extrinsic matrix can be used to combine data from a camera with data from another sensor, for example, to merge 2D camera images with 3D data from other sensors (e.g., LIDAR point clouds) or to merge 2D camera images from two different cameras to form a depth image based on a disparity between the camera images.

The data collection module 420 is configured to collect data during operation of the autonomous vehicle in a work-site environment. The collected data includes sensor data obtained directly from one or more sensors (e.g., position/displacement of joy stick/accelerator, steering, brakes, road elevation or angle, air temperature, humidity, linear velocity, angular velocity, etc.) during operation of the autonomous vehicle in a work-site environment, sensor data obtained and processed by another system component such as the planning subsystem 220, the pre-processed sensor data from the pre-processing module 410, or a combination thereof. The data collection module 420 is further configured to store the data in a storage device (e.g., a local or remote persistent memory) for further downstream processing, or forward the collected data in a data stream or in batches to an offline model training system, as described with respect to FIG. 5, or the kinematic and dynamic behavior estimation module 430 for further downstream processing. In some embodiments, the data collection module 420 is further configured to organize the collected data into categories prior to storing or forwarding for further processing. For example, the data collection module 420 may be configured to organize the collected data into a list of inputs and outputs. The inputs being data pertaining to the vehicle systems control during operation of the autonomous vehicle in the work-site environment such as position/displacement of joy stick/accelerator, steering, brakes, etc., and environmental conditions identified during operation of the autonomous vehicle in the work-site environment such as temperature, precipitation, humidity, inches of snow on path surface, depth of gravel surface, angle of incline or slope, etc. The outputs being operating information such as yaw rate, wheel speed, steering angles, linear velocity and angular velocity of the autonomous vehicle in the work-site environment achieved as a result of the inputs for control of the autonomous vehicle.

Kinematic and dynamic behavior estimation module 430 is configured to obtain the collected data from the data collection module 420 and use the collected data to estimate kinematics and dynamic behavior for the autonomous vehicle. In some instances, the kinematic and dynamic behavior estimation module 430 trains, fits, and updates one or more predictive models on the collected data for future autonomous operations. In other instances, the kinematic and dynamic behavior estimation module 430 continuously updates (e.g., on a real time basis) the one or more predictive models on the collected data to continually improve control of the autonomous vehicle. In yet other instances, the kinematic and dynamic behavior estimation module 430 predicts output based on new input variables within the on the collected data using the one or more predictive models for improved control of the autonomous vehicle (e.g., greater stability in the work-site environment). For example, the kinematic and dynamic behavior estimation module 430 may receive a list of inputs ($x_1$) and associated outputs ($y_1$) from the data collection module 420; train, fit, and update one or more predictive models on the inputs ($x_1$) and associated outputs ($y_1$); receive a second list of inputs ($x_2$) that the planning subsystem 220 and control system 225 have identified for accomplishing an action or task (e.g., make a right turn in 20 meters); predict a set of outputs ($y_2$) using the trained one or more predictive models; forward the set of outputs ($y_2$) to the stability control module 440, which can be used in downstream processing for control of the autonomous vehicle; receive a third list of inputs ($x_3$) and associated outputs ($y_3$) from the data collection module 420 (may be received as a result of the control module 425 implementing control using the predict a set of outputs ($y_2$)); and update the one or more predictive models using the inputs ($x_3$) and associated outputs ($y_3$).

The stability control module 440 is configured to use predicted output (e.g., linear velocity and angular velocity) to control the autonomous vehicle in a manner that avoids instability. In some embodiments, the operation of the autonomous vehicle is modified according to the predicted output of the kinematic and dynamic behavior estimation module 430. For example, the stability control module 440 may receive operating information from the data collection module 420 and predicted output from the kinematic and dynamic behavior estimation module 430. The operating information may include any operating information such as yaw rate, wheel speed, steering angles, road conditions, environmental conditions, as well as other information used by the stability control subsystem 400. The stability control module 440 can determine if the vehicle behavior is stable. In some instances, the stability of the vehicle is determined by comparing the actual path and/or the predicted path (based on the predicted output) of the autonomous vehicle with the intended path. If the stability control module 440 determines the vehicle behavior is stable, then control continues as programmed (e.g., as presently instructed by the planning subsystem 220 and control system 225). If the stability control module 440 determines the vehicle behavior is unstable (e.g., the autonomous vehicle has encounter rough terrain resulting in instable conditions), then the stability control module 440 may calculate a set of corrected input data such as position/displacement of joy stick/accelerator, steering, brakes, etc. to stabilize the autonomous vehicle and bring the autonomous vehicle back into the intended path. In some instances, the stability control module sends the calculated set of corrected input data to the kinematic and dynamic behavior estimation module 430 for processing to obtain updated predicted output. Thereafter, the stability control module 440 can determine if the vehicle behavior will be stable by comparing the updated predicted path (based on the updated predicted output) of the autonomous vehicle with the intended path. If the stability control module 440 determines the vehicle behavior will be stable, then stability control module 440 sends the set of corrected input data to the planning subsystem 220, control system 225, and/or vehicle systems 115 to modify the operation of the autonomous vehicle. If the stability control module 440 determines the vehicle behavior will still be unstable, then stability control module 440 recalculates the set of corrected input data and the process repeats until the autonomous vehicle is brought back into the intended path and the autonomous vehicle is stabilized.

Figure 5:
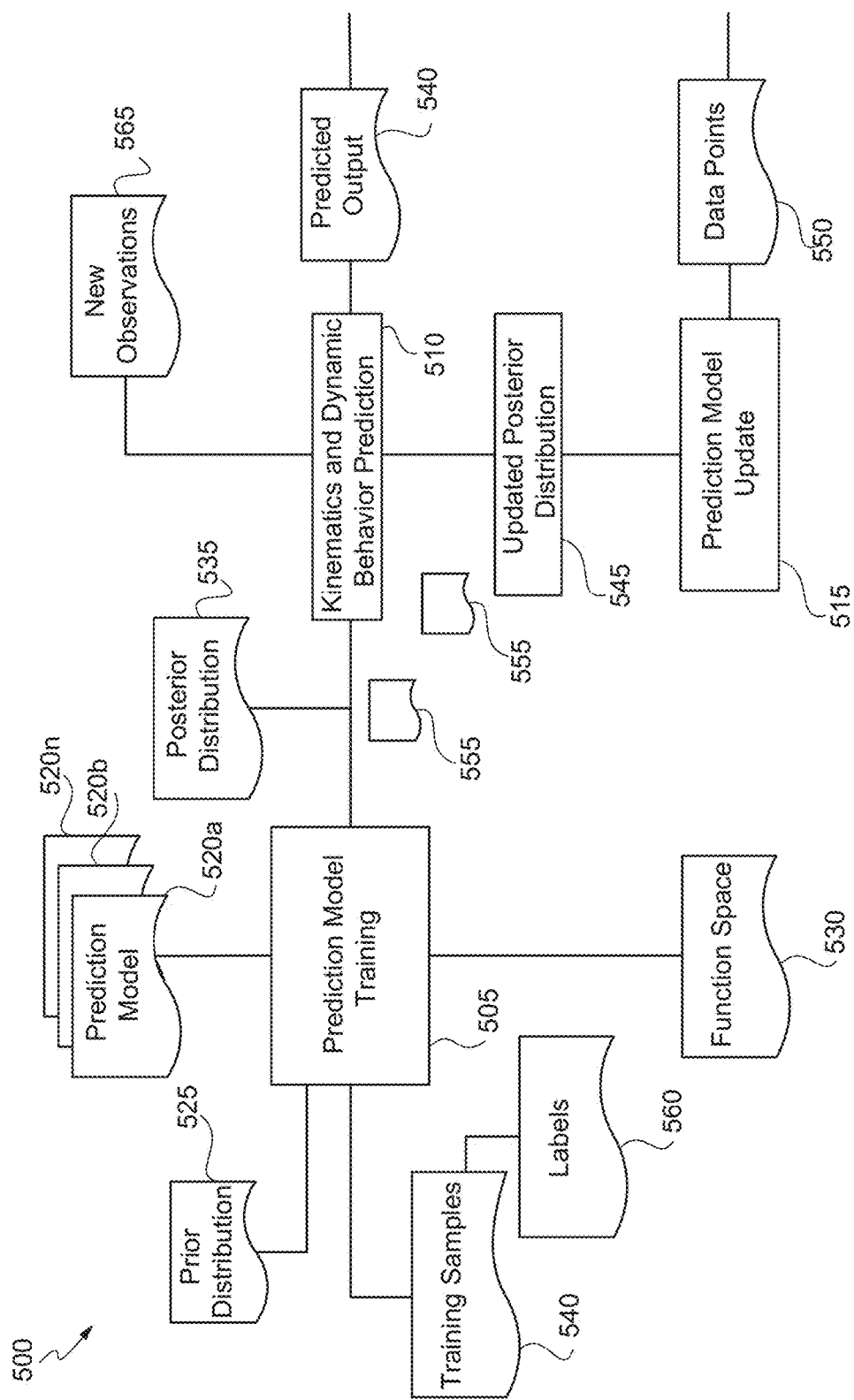
FIG. 5 illustrates a machine-learning modeling system for estimating kinematics and dynamic behavior to improve navigation, digging and material carrying tasks of an autonomous vehicle according to various embodiments.

FIG. 5 shows a block diagram illustrating aspects of a machine-learning modeling system 500 for estimating kinematics and dynamic behavior to improve navigation, digging and material carrying tasks of an autonomous vehicle. As shown in FIG. 5, the predictions performed by the machine-learning modeling system 500 in this example include several stages: a prediction model training stage 505, a kinematics and dynamic behavior prediction stage 510, and a prediction model update stage 515. The prediction model training stage 505 builds and trains one or more prediction models 520a-520n ('n' represents any natural number) to be used by the other stages (which may be referred to herein individually as a prediction model 520 or collectively as the prediction models 520). For example, the prediction models 520 can include one or more Bayesian models that estimate an underlying function amongst all possible functions. In various instances, at least one of the prediction models 520 includes structures and variables related to a Gaussian process (e.g., a covariance matrix, a mean function, and dependent variables y that can be modeled as a function of independent variables x). The Gaussian process in the prediction models 520 is a substitute of regression modeling or curve fitting with a machine learning non-parametric approach (not limited by a set number of parameters and instead considers an indefinite number of parameters), in that the Gaussian process finds a distribution over the possible functions that are consistent with the observed data. The Gaussian process works by specifying a prior distribution 525 over all admissible functions that fit a defined function space 530, calculating a posterior distribution 535 using training samples 540, and computing an updated posterior distribution 545 on data points of interest 550 using trained models 555.

To train the various prediction models 520 in this example, initially a Gaussian process prior distribution 525 is generated, which may be specified using a mean function and covariance matrix. More specifically, a Gaussian process is similar to an infinite-dimensional multivariate Gaussian distribution, where any collection of the labels 560 of the training samples 540 are joint Gaussian distributed. Within this Gaussian process prior distribution 525, prior knowledge may be incorporated about a predefined function space 530 (constraints placed on the possible functions to reduce complexity) through the selection of the mean function and the covariance matrix. The covariance matrix ensures that values that are close together in input space will produce output values that are close together. The training samples 540 are comprised of inputs or observations (independent variables x) and their outputs or labels (dependent variables y) 560, and the training samples 540 may be split into training, testing, and/or validation subsets. In some instances, the training samples 540 for each prediction model 520 include sensor data collected pertaining to operation of an autonomous vehicle in a work-site environment, as described with respect to FIGS. 1A,1B, 2A, 2B, 3, and 4.

For example, for a prediction model 520 to be utilized to predict kinematic and dynamic behavior for an autonomous vehicle, the observations may include sensor data (e.g., real time sensor data and/or collected historical sensor data) such as position/displacement of joy stick/accelerator, steering position/angle, position/displacement of brake, road elevation angle, air temperature, and humidity while the vehicle is in operation, and the labels 560 may include operating information (e.g., real time operating information and/or collected historical operating information) such as yaw rate, wheel speed, steering angles, linear velocity and angular velocity of the autonomous vehicle in the work-site environment achieved as a result of the observations for control of the autonomous vehicle. From the Gaussian process prior distribution 525, a collection of training points and/or test points are joint multivariate Gaussian distributed within a covariance matrix with entries that correspond to the covariance matrix evaluated at the observations (independent variables x). In some instances, distributed Gaussian noise may be incorporated independently to the labels (dependent variables y) 560 by summing the label distribution and noise distribution.

The form of the mean function and covariance matrix in the Gaussian process defining the prior distribution 525 may be chosen and tuned during model selection. In some instances, the mean function may be constant, either zero or the mean of the training samples 540. There are a number options for the covariance matrix: in certain instances the covariance matrix can have many forms as long as it follows the properties of a kernel (i.e., semi-positive definite and symmetric). Some covariance matrix include constant, linear, square exponential and Matern kernel, as well as a composition of multiple kernels. For example, a kernel may be the composition of the constant kernel with the radial basis function (RBF) kernel, which encodes for smoothness of functions (e.g., similarity of inputs in space corresponds to the similarity of outputs). After specifying the covariance matrix, other choices can be specified for the predictive models 520. For example, an alpha parameter may be defined as the variance of the distributed Gaussian noise on the labels 560, and/or a normalize parameter may be defined that refers to the constant mean function—either zero if False or the training data mean if True.

Figure 6A:
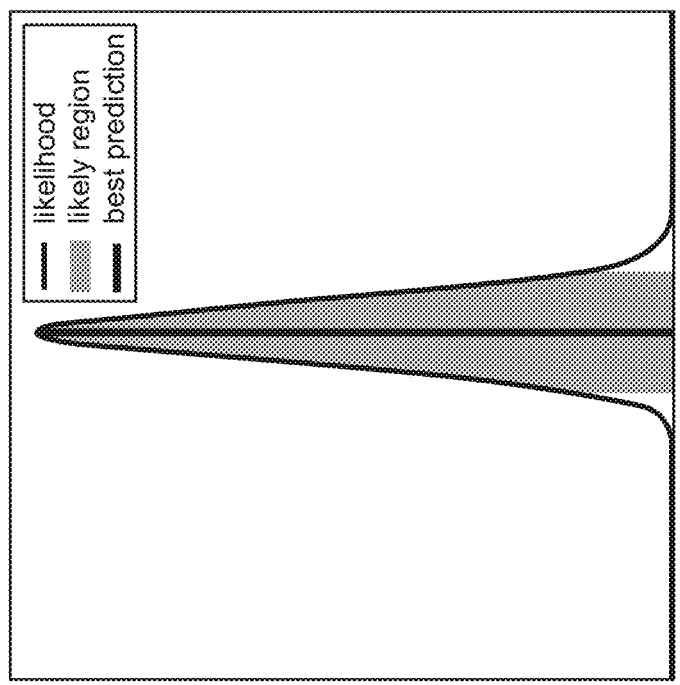
FIGS. 6A and 6B illustrate fitting of one or more trained models with observed data according to various embodiments.

Once the mean function and the covariance matrix are identified for the prior distribution 525, the prediction models 520 may be fit with the training samples 540, tested (including optimization of hyperparameters), validated, and ultimately used to calculate the posterior distribution 535 from the prior distribution 525. FIG. 6A shows seven training points (observations) being used to calculate an instance of the posterior distribution 535 from the prior distribution 525. The seven training points (observations) have narrowed the set of possible functions from the prior distribution 525 to only those functions of the posterior distribution 535. The dark line represents the best prediction for the one or more functions of the posterior distribution 535 and the lighter regions represent the likely regions or uncertainty for one or more functions of the posterior distribution 535. The uncertainty could be rendered more certain with additional observed data from those regions. Although the training mechanisms described herein mainly focus on training a prediction model 520, these training mechanisms can also be utilized to fine tune or update existing prediction models 520 trained from other datasets (e.g., data sets from work-site environments with similar conditions). For example, in some cases, a prediction model 520 might have been pre-trained using pre-existing train data from work-site environments with similar conditions. In those cases, the prediction models 520 can be retrained using the training samples 540 containing observations and labels as discussed herein.

The prediction model training stage 505 outputs trained prediction models 520 including the trained kinematics and dynamic behavior models 555. The trained kinematics and dynamic behavior models 555 may be used in the kinematics and dynamic behavior prediction stage 510 to generate kinematics and dynamic behavior predictions for outputs (y) 540 based on the posterior distribution 535 or an updated posterior distribution 545, and new observations (x) 565. For example, for skid-steer prediction and control, the new observations 560 may include the position of the joy stick control or other controls e.g., accelerator, steering angle, brakes etc. and other situational and environment related variables, and the predicted outputs 540 may be estimated linear and angular velocities of the autonomous vehicle. The new observations (x) 565 may be sampled from the posterior distribution 535 or updated posterior distribution 545 to obtain the predicted outputs (y) 540. In downstream processes, the predicted outputs (y) 540 can be used for control of the autonomous vehicle.

Figure 6B:
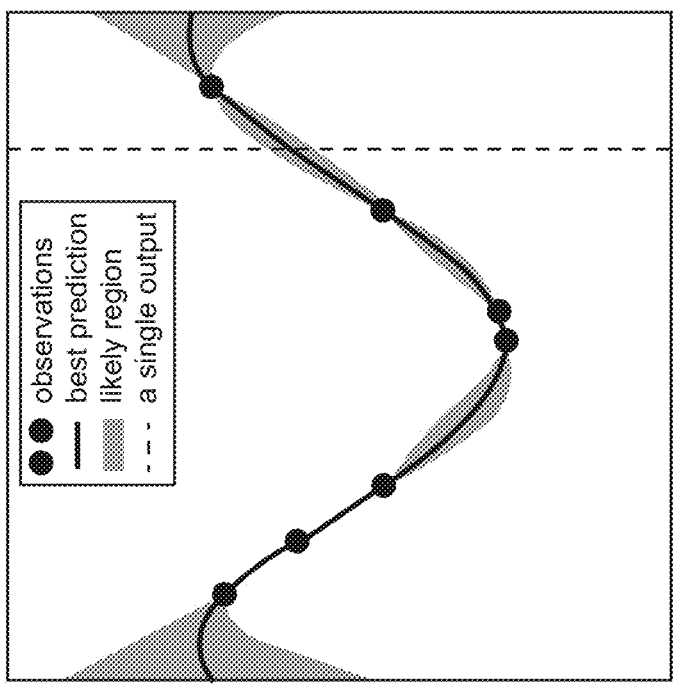

The prediction model update stage 515 calculates the updated posterior distribution 545 and updates the trained kinematics and dynamic behavior models 555 based on observed data points of interest 550. In some instances, to calculate the updated posterior distribution 545, the data and the test observations are conditioned out of the posterior distribution 535. Because a Gaussian process prior distribution 525 was chosen for training the models 520, calculating the updated posterior distribution 545 is tractable through the posterior distribution 535, and leads to a normal distribution that can be completely described by the mean function and covariance matrix. FIG. 6B shows an observed data point of interest 550 being used to calculate the updated posterior distribution 545 from the prior distribution 525 or posterior distribution 535 using the covariance matrix. The observed data point of interest 550 has narrowed the set of possible functions from the prior distribution 525 or posterior distribution 535 to only those functions of the updated posterior distribution 545. The dark line represents the best prediction for the one or more functions of the updated posterior distribution 545 and the lighter regions represent the likely regions or uncertainty for one or more functions of the updated posterior distribution 545. The uncertainty could be rendered more certain with additional observed data from those regions.

In certain embodiments, a sparse method, for example, Sparse Online Gaussian Process Sparse (SOGP) or Online Noisy Input Gaussian Process (SONIG) algorithm, is used for selecting new/additional data point of interest 550 for updating the trained model. For example, if the new/additional data point of interest 550 is substantially close to existing observations, then the data point of interest 550 will not be included in the training of the model and the calculation of the updated posterior distribution 545. If the new/additional data point of interest 550 is not substantially close to existing observations, then the data point of interest 550 will be included in the training of the model and the calculation of the updated posterior distribution 545.

The machine-learning modeling system 500 may be implemented using various approaches to enable the automation of a vehicle on a completely new operating surface or a changing operating surface. In one exemplary approach, a vehicle may be first operated manually or via remote control in a work-site environment for a predetermined or arbitrary amount of time to collect data (input and output data) pertaining to the training samples 540. The input data (observations) may be associated or labeled with the corresponding output data (e.g., labels 560). The prediction model training stage 505 trains one or more models 520 having a prior distribution 525 using the training samples 540 until the one or more models 520 are fitted, tested, and/or validated. In some instances, the prediction model training stage 505 is implemented offline from the autonomous vehicle (e.g., in a system or computing device separate from the autonomous vehicle) to train the one or more models 520. In other embodiments, the prediction model training stage 505 is implemented onboard the autonomous vehicle (e.g., in a system or computing device of the autonomous vehicle) to train the one or more models 520 and calculate a posterior distribution 535.

Once the one or more models 520 are fitted, tested, and/or validated, the one or more models 520 may be deployed (e.g., in a system or computing device of the autonomous vehicle) as one or more trained models 555 having the posterior distribution 535 for full autonomous operations in the kinematics and dynamic behavior prediction stage 510. The autonomous vehicle may be operated in the work-site environment and during operation new observations may be used in the kinematics and dynamic behavior prediction stage 510 as input in the one or more trained models 555 to generate predicted output 540 based on the posterior distribution 535. With autonomous operation of the vehicle underway, the one or more trained models 555 may be continuously updated on a real time basis in the prediction model update stage 515 using select data points 550 to calculate an updated posterior distribution 545 and ultimately improve control.

In another exemplary approach, a vehicle may be loaded with a baseline model (e.g., a pre-trained model 555) trained and fitted on training samples 540 collected in a work-site environment substantially similar to an actual work-site environment. The autonomous vehicle may be operated in a safe zone of the work-site environment (an area with similar conditions to the work-site environment but reserved for testing to minimize harm to the vehicle, persons, machines, other vehicles, etc.) and during operation the one or more trained models 555 may be continuously updated on a real time basis in the prediction model update stage 515 using select data points 550 to calculate an updated posterior distribution 545 (specific to the conditions of the work-site environment). Once the one or more trained models 555 are updated with observed data from operation of the vehicle in the safe zone of the work-site environment, the one or more models 555 may be fully deployed (e.g., in a system or computing device of the autonomous vehicle) having the updated posterior distribution 535 for full autonomous operations in the kinematics and dynamic behavior prediction stage 510. The autonomous vehicle may be operated in the work-site environment and during operation new observations may be used in the kinematics and dynamic behavior prediction stage 510 as input in the one or more trained models 555 to generate predicted output 540 based on the updated posterior distribution 535. With autonomous operation of the vehicle underway, the one or more trained models 555 may be continuously updated on a real time basis in the prediction model update stage 515 using select data points 550 to recalculate an updated posterior distribution 545 and ultimately improve control.

Figure 7:
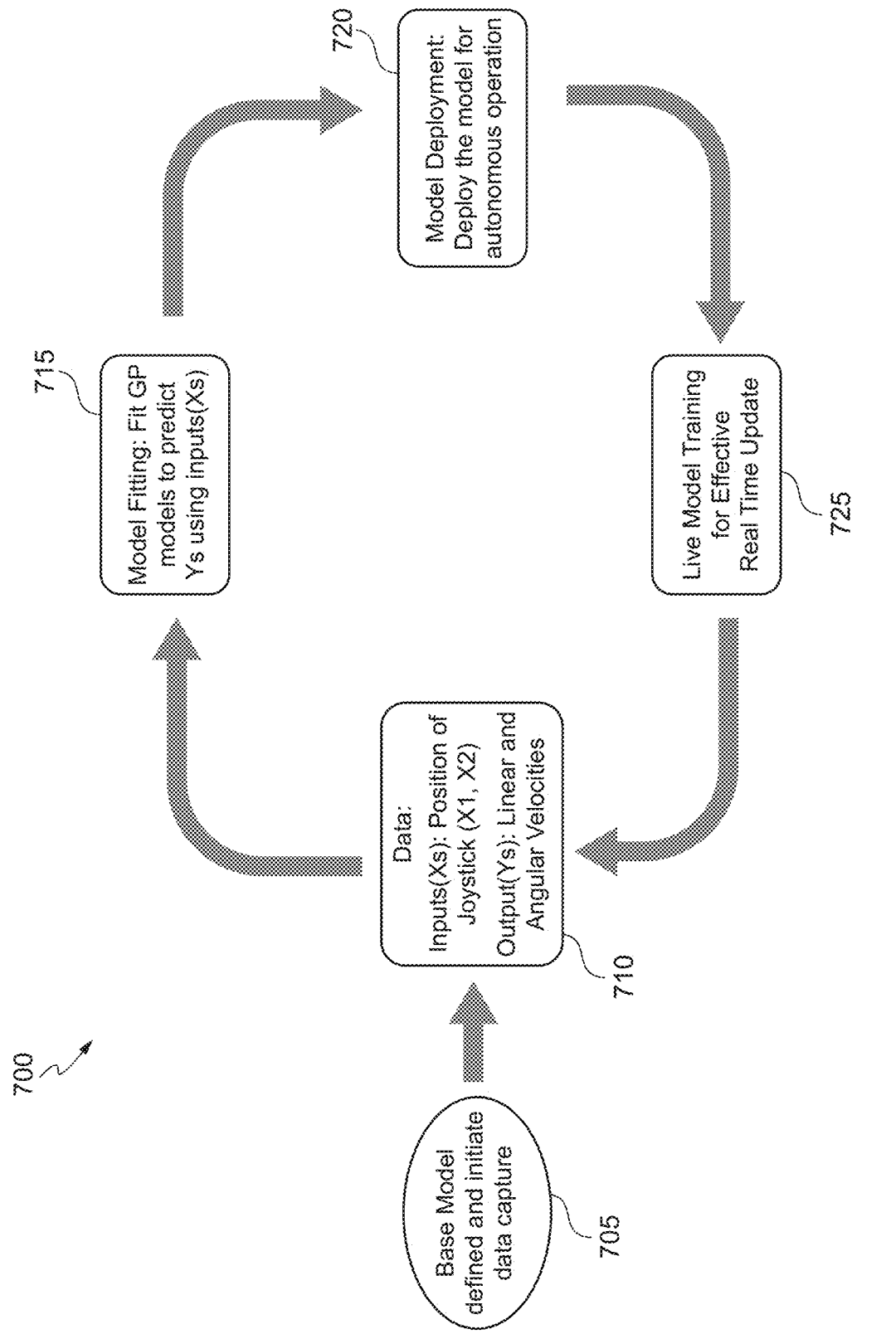
FIG. 7 is a simplified block diagram illustrating an example method for implementing a machine learning model to estimate kinematics and dynamic behavior of an autonomous vehicle according to various embodiments.

FIG. 7 is a block diagram illustrating a process 700 for implementing a machine learning model to estimate kinematics and dynamic behavior of an autonomous vehicle according to various embodiments. The processing depicted in FIG. 7 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 7 and described below is intended to be illustrative and non-limiting. Although FIG. 7 depicts various processing steps occurring in a particular sequence or order, this is not intended to be limiting. In certain alternative embodiments, the steps may be performed in a different order, certain steps omitted, or some steps performed in parallel. In certain embodiments, such as in the embodiment depicted in FIG. 4, the processing depicted in FIG. 7 may be performed by a machine learning model in a stability control subsystem (e.g., a machine learning model implemented by the kinematic and dynamic behavior estimation module 420) in conjunction with a computing device or system configured to supply training input to the machine learning model for training of the machine learning model, such as in the embodiment depicted in FIG. 5.

At step 705, a base model is defined to estimate kinematics and dynamic behavior of an autonomous vehicle. In various embodiments, the base model is a Bayesian model that estimates an underlying function amongst all possible functions. In some instances, the Bayesian model includes a Gaussian process defined by a mean function and a covariance matrix. A Gaussian process is a random process where any point $x \in Rd$ is assigned a random variable $f(x)$ and where the joint distribution of a finite number of these variables $p(f(x_1), \ldots, f(x_N))$ is itself Gaussian and defines a prior distribution $p(f|X)$ over functions, for example, $f=(f(x_1), \ldots, f(x_N))$, $\mu=(m(x_1), \ldots, m(x_N))$ and $K_{ij}=K(x_i,x_j)$, where m is the mean function and K is a positive definite kernel function or the covariance matrix. Thus, the Gaussian process is a distribution over functions whose shape (e.g., smoothness) is defined by K. If points $x_i$ and $x_j$ are considered to be similar by the kernel, then the function values at these points, $f(x_i)$ and $f(x_j)$, can also be expected to be similar. The Gaussian process prior distribution $p(f|X)$ can be converted into a Gaussian process posterior distribution $p(f|X,y)$ after having observed some data y. The posterior distribution $p(f|X,y)$ can then be used to make predictions given new input.

At step 710, data comprising representations of operation of an autonomous vehicle in a work-site environment are obtained. The obtained data includes sensor data obtained from one or more sensors (e.g., position/displacement of joy stick/accelerator, steering, brakes, road elevation or angle, air temperature, humidity, linear velocity, angular velocity, etc.) during operation of the autonomous vehicle in the work-sire environment, and/or the pre-processed sensor data from the pre-processing module 410. In some instances, the obtained data comprises independent variables x (input) and dependent variables y (output). The inputs being data pertaining to the vehicle systems control during operation of the autonomous vehicle in the work-site environment such as position/displacement of joy stick/accelerator, steering, brakes, etc., and environmental conditions identified during operation of the autonomous vehicle in the work-site environment such as temperature, precipitation, humidity, inches of snow on path surface, depth of gravel surface, angle of incline or slope, etc. The outputs being operating information such as yaw rate, wheel speed, steering angles, linear velocity and angular velocity of the autonomous vehicle in the work-site environment achieved as a result of the inputs for control of the autonomous vehicle.

At step 715, the base model is trained and fitted with the obtained data to generate a trained model capable of predicting dependent variables y (output) using independent variables (x) (input). The training and fitting includes converting the process prior distribution $p(f|X)$ into a Gaussian process posterior distribution $p(f|X,y)$ using the observed independent variables x (input) and dependent variables y (output) from the obtained data. For example, since the Gaussian process allows for the base model to describe the prior distribution $p(f|X)$ over functions, Bayes' rule can be used to update the Gaussian process by observing the obtained data to allow for the base model to describe the posterior distribution $p(f|X,y)$ over functions. The updated Gaussian process is constrained to the possible functions that fit the observed data, for example, the mean of the one or more functions intercepts all training points within the observed data.

At step 720, the trained model is deployed for autonomous operation. In some instances, the trained model having the posterior distribution $p(f|X,y)$ is implemented in an autonomous vehicle to make predictions for controlling the vehicle in a work-site environment.

The trained model may be deployed by uploading and saving the trained model in a system or computing device of the autonomous vehicle. In certain embodiments, the autonomous machine may already have an earlier version of the trained model deployed thereon. If so, the deployment in 720 may involve updating the existing model, e.g., by communicating functions and other parameters of the machine learning model to the autonomous vehicle. In certain embodiments, the trained model is optimized prior to deployment (e.g., hyperparameters may be optimized). Optimization may be determined through statistical analysis of the state of the trained model, e.g., by computing histograms of the posterior distribution $p(f|X,y)$ over functions. Thereafter, the autonomous vehicle may be operated in the work-site environment and during operation new observations may be used as input in the trained model to generate predicted output based on the posterior distribution $p(f|X,y)$. With autonomous operation of the vehicle underway, at step 725 the trained model is continuously updated on a real time basis using select data points (e.g., newly observed independent variables x (input) and dependent variables y (output)) to recalculate an updated posterior distribution $p(f|X,y')$ and ultimately improve predictions for controlling the vehicle in the work-site environment. In some instances, a sparse method is used for selecting new/additional data point for updating the trained model (e.g., not all data points being observed as the autonomous vehicle operates in the work-site environment will be used to update the model and calculate the updated posterior distribution $p(f|X,y')$).

Figure 8:
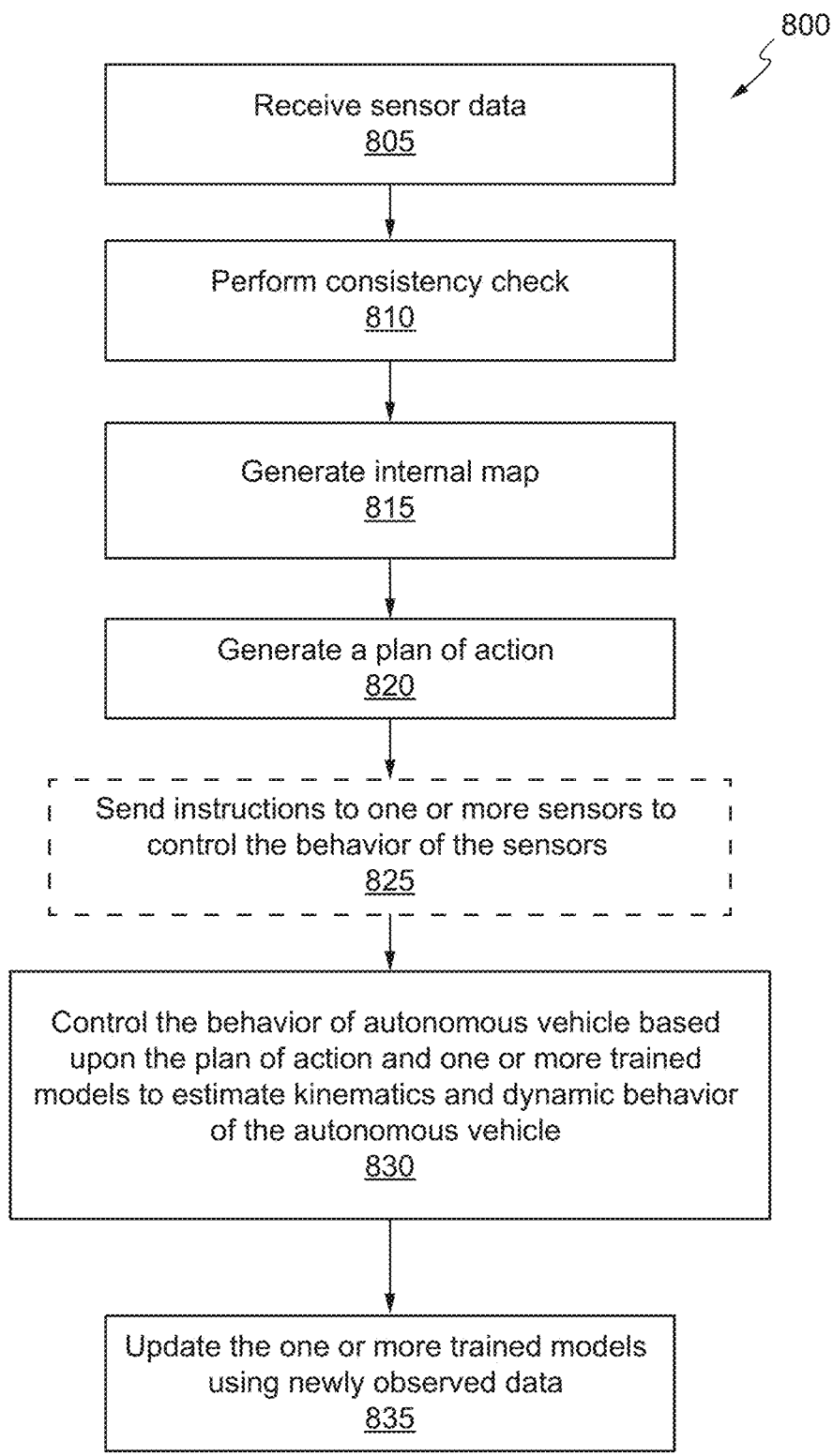
FIG. 8 is a flow chart illustrating a process for providing dynamic stability control to an autonomous vehicle according to various embodiments.

FIG. 8 is a flow chart illustrating a process 800 for providing dynamic stability control to an autonomous vehicle according to various embodiments. The processing depicted in FIG. 8 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 8 and described below is intended to be illustrative and non-limiting. Although FIG. 8 depicts various processing steps occurring in a particular sequence or order, this is not intended to be limiting. In certain alternative embodiments, the steps may be performed in a different order, certain steps omitted, or some steps performed in parallel. In certain embodiments, such as in the embodiment depicted in FIGS. 2A and 4, the processing depicted in FIG. 8 may be performed by a machine learning model in a stability control subsystem (e.g., a machine learning model implementing the kinematic and dynamic behavior estimation module 420) in conjunction with a computing device or system configured to supply training input to the machine learning model for training of the machine learning model, such as in the embodiment depicted in FIG. 5.

At step 805, sensor data sensed by one or more sensors and/or other inputs are received by an autonomous vehicle management system. For example, sensor data may be received from a GPS sensor, one or more cameras mounted on the autonomous vehicle, an accelerometer, a steering sensor, a brake sensor, a joy stick displacement sensor, from LIDAR, and the like. At step 810, consistency checks (e.g., performed by a consistency module) are performed on the received sensor data, including performing rationality checks and deficiency checks on the received sensor data and normalizing the received sensor data to generate normalized sensor data. At step 815, a consistent internal map is generated and/or updated by autonomous vehicle management system based upon the sensor data received in step 805 and normalized in step 810. In certain embodiments, a perception subsystem is configured to receive the sensor data and generate the internal map. If an internal map has already been previously generated, generating the internal map in may include updating the consistent internal map based on newly received sensor data. As previously described, the consistent internal map can be a three-dimensional map of the autonomous vehicle's environment. The internal map generated in step 815 may be continually updated as the state of autonomous vehicle and the state of the environment around the autonomous vehicle changes. The processing in step 815 ensures that a consistent internal map is kept up to date.

At step 820, the autonomous vehicle management system generates a plan of action using the internal map generated in step 815 and based upon other inputs such as the goal to be achieved by autonomous vehicle, safety considerations, localization information, and the like. In certain embodiments, processing in step 820 may be performed by planning subsystem of autonomous vehicle management system. There are various ways in which planning subsystem may access the internal map generated in step 815. In one instance, an application programming interface (API) may be provided that enables planning subsystem to access and query the internal map. In other instances, other mechanisms may be provided that enable planning subsystem to access and use the internal map.

At optional step 825, the planning subsystem sends instructions to one or more sensors to control the behavior of the sensors. For example, the sensor data captured by the sensors and/or communicated from the sensors to autonomous vehicle management system may be dynamically and on-demand controlled by autonomous vehicle management system. This may result in autonomous vehicle management system receiving changed sensor data (in step 805), and the internal map may be regenerated or updated based upon the changed sensor data.

At step 830, the behavior of autonomous vehicle is controlled based upon the plan of action generated in step 820. As described herein, in some embodiments, the plan of action generated by planning subsystem may be communicated to controls subsystem, which may then control one or more systems of vehicle systems to control the behavior of autonomous vehicle to achieve a goal in a safe manner. The autonomous vehicle management system may use various AI and deep learning based models and techniques to perform its processing and control the behavior of the autonomous vehicle. For example, AI based techniques (e.g., a Bayesian model) may be used by the controls subsystem (e.g., the stability control subsystem) to estimate kinematics and dynamic behavior of the autonomous vehicle and improve control of the autonomous vehicle. As another example, planning subsystem may use AI based techniques (e.g., a Bayesian model) to generate a plan of action comprising a sequence of one or more actions to be performed by the autonomous vehicle in order to meet a certain goal in a stable manner.

In various embodiments, control of the autonomous vehicle in accordance with the plan of action may comprise obtaining collected data and using the collected data to estimate kinematics and dynamic behavior for the autonomous vehicle. In some instances, the stability control subsystem trains, fits, and updates one or more predictive models on the collected data for the autonomous operations. In other instances, the stability control subsystem continuously updates the one or more predictive models on real time basis to continually improve control of the autonomous vehicle. In yet other instances, the stability control subsystem predicts output based on new input variables using the one or more predictive models for improved control of the autonomous vehicle (e.g., greater stability in the work-site environment). For example, the stability control subsystem may receive a list of inputs ($x_1$) and associated outputs ($y_1$); train, fit, and update one or more predictive models on the inputs ($x_1$) and associated outputs ($y_1$); receive a second list of inputs ($x_2$) that the planning subsystem and control system have identified for accomplishing an action or task (e.g., make a right turn in 20 meters); predict a set of outputs ($y_2$) using the trained one or more predictive models; receive a third list of inputs ($x_3$) and associated outputs ($y_3$) (may be received as a result of implementing control using the predicted set of outputs ($y_2$)); and update the one or more predictive models using the inputs ($x_3$) and associated outputs ($y_3$).

The control of the autonomous vehicle in accordance with the plan of action may further comprise using the predicted set of outputs ($y_2$) (e.g., linear velocity and angular velocity) to control the autonomous vehicle in a manner that avoids instability. In some embodiments, the operation of the autonomous vehicle is modified according to the predicted set of outputs ($y_2$). For example, the stability control subsystem may receive operating information and predict output. The operating information may include any operating information such as yaw rate, wheel speed, steering angles, as well as other information used by the stability control system. The stability control subsystem can determine if the vehicle behavior is stable. In some instances, the stability of the vehicle is determined by comparing the actual path and/or the predicted path (based on the predicted output) of the autonomous vehicle with the intended path. If the stability control subsystem determines the vehicle behavior is stable, then control continues as programmed (e.g., as presently instructed by the planning subsystem and control system). If the stability control subsystem determines the vehicle behavior is unstable, then the stability control subsystem may calculate a set of corrected input data such as position/displacement of joy stick/accelerator, steering, brakes, etc. to stabilize the autonomous vehicle and bring the autonomous vehicle back into the intended path. In some instances, the stability control subsystem inputs the calculated set of corrected input data into the one or more predictive models to obtain updated predicted output. Thereafter, the stability control subsystem can determine if the vehicle behavior will be stable by comparing the updated predicted path (based on the updated predicted output) of the autonomous vehicle with the intended path. If the stability control subsystem determines the vehicle behavior will be stable, then the stability control subsystem sends the set of corrected input data to the planning subsystem, control system, and/or vehicle systems to modify the operation of the autonomous vehicle. If the stability control subsystem determines the vehicle behavior will still be unstable, then the stability control subsystem recalculates the set of corrected input data and the process repeats until the autonomous vehicle brought back into the intended path and the autonomous vehicle is stabilized.

With autonomous operation of the vehicle underway, at step 835 the one or more predictive models are continuously updated on a real time basis using select data points (e.g., newly observed independent variables x (input) and dependent variables y (output)) to recalculate an updated posterior distribution and ultimately improve predictions for controlling the vehicle in the work-site environment. In some instances, a sparse method is used for selecting new/additional data point for updating the trained model (e.g., not all data points being observed as the autonomous vehicle operates in the work-site environment will be used to update the model and calculate the updated posterior distribution).

Figure 9:
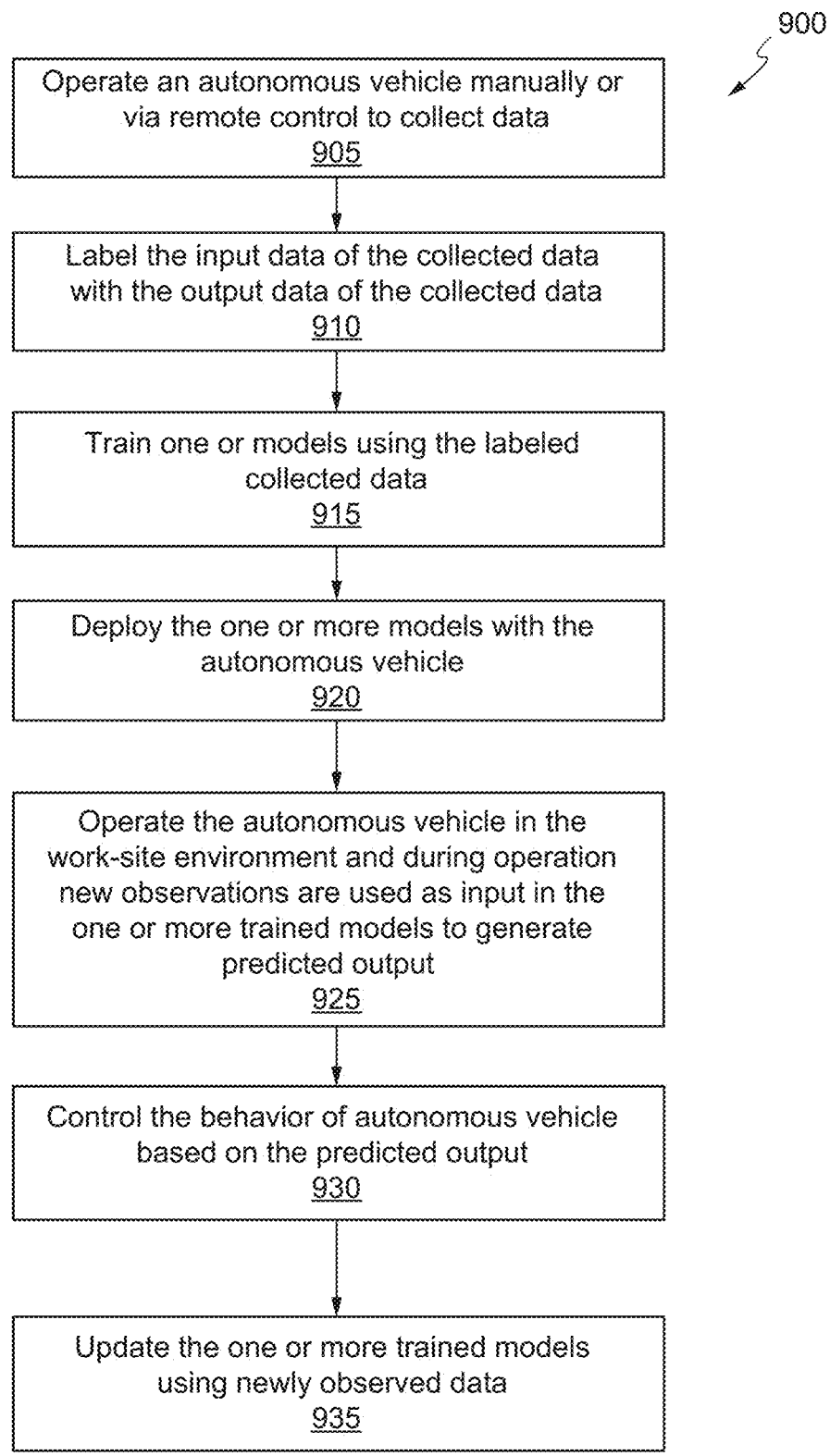
FIG. 9 is a flow chart illustrating a process for real time update of a predictive model according to various embodiments.

FIG. 9 is a flow chart illustrating a process 900 for the real time update of a predictive model according to various embodiments. The processing depicted in FIG. 9 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 9 and described below is intended to be illustrative and non-limiting.

Although FIG. 9 depicts various processing steps occurring in a particular sequence or order, this is not intended to be limiting. In certain alternative embodiments, the steps may be performed in a different order, certain steps omitted, or some steps performed in parallel. In certain embodiments, such as in the embodiment depicted in FIGS. 2A and 4, the processing depicted in FIG. 9 may be performed by a machine learning model in a stability control subsystem (e.g., a machine learning model implementing the kinematic and dynamic behavior estimation module 420) in conjunction with a computing device or system configured to supply training input to the machine learning model for training of the machine learning model, such as in the embodiment depicted in FIG. 5.

At step 905, an autonomous vehicle is operated manually or via remote control for a predetermined or arbitrary amount of time to collect data (input and output data) pertaining to the work-site environment for training samples. The data may be collected by a plurality of sensors and at least some of the data may be designated as a training set of sensor data for training a prediction model (one or more prediction models). In some instances, a training set of sensor data is obtained by a controller system of the autonomous vehicle. The training set of sensor data provides a representation of operation of the autonomous vehicle in a worksite environment. At step 910, the input data (observations) is associated or labeled with the corresponding output data. In some instances, the first set of sensor data is saved in a data matrix in a manner that associates or labels the input data (e.g., displacement of the accelerator, brake, and steering) with corresponding output data (e.g., resulting linear and angular velocities of the autonomous vehicle).

At step 915, a prediction model (one or more prediction models) having a prior distribution are trained using the training samples until the model is fitted, tested, and/or validated. In some instances, the prediction model includes a Gaussian process and the prediction model is trained using the training set of sensor data to generate a trained model (one or more trained models). The Gaussian process defines a prior distribution over the one or more functions that define the relationship between the independent variables and the dependent variables for the operation of the autonomous vehicle in the worksite environment, and the training comprises calculating a posterior distribution over the one or more functions for the trained model based on the training set of sensor data. The independent variables may include position or displacement of joy stick or accelerator, steering position or angle, position or displacement of brake, road elevation angle, air temperature, humidity or a combination thereof while the autonomous vehicle is in operation, and the dependent variables may include the linear velocity, angular velocity, or a combination thereof while the autonomous vehicle is in operation. In some instances, the training is implemented offline from the autonomous vehicle (e.g., in a system or computing device separate from the autonomous vehicle) to train the prediction model and calculate a posterior distribution. In other embodiments, the training is implemented onboard the autonomous vehicle (e.g., in a system or computing device of the autonomous vehicle) to train the prediction model and calculate a posterior distribution.

Once the prediction model is fitted, tested, and/or validated, the model is deployed at step 920 (e.g., in a system or computing device of the autonomous vehicle) as a trained model having the posterior distribution for full autonomous operations in the work-site environment. The trained model may be deployed by uploading and saving the trained model in a system or computing device of the autonomous vehicle. In certain embodiments, the autonomous machine may already have an earlier version of the trained model deployed thereon. If so, the deployment in 920 may involve updating the existing model, e.g., by communicating functions and other parameters of the machine learning model to the autonomous vehicle. In certain embodiments, the trained model is optimized prior to deployment (e.g., hyperparameters may be optimized).

At step 925, the autonomous vehicle is operated autonomously in the work-site environment and during operation new observations are used as input in the one or more trained models to generate predicted output based on the posterior distribution. In some instances, a first set of sensor data is obtained by the controller system of the autonomous vehicle. The first set of sensor data provides a representation of operation of the autonomous vehicle in the worksite environment. A first set of output data may be estimated by the trained model based on the first set of sensor data. The Gaussian process of the trained model defines the posterior distribution over one or more functions that define a relationship between the independent variables and the dependent variables for the operation of the autonomous vehicle in the worksite environment.

At step 930, the predicted output is used to improve control of the autonomous vehicle as described in detail herein. In some instances, one or more operations of the autonomous vehicle in the worksite environment are controlled by the controller system using a first set of input data. The first set of input data is derived from the first set of sensor data and the first set of output data. For example, the controlling the one or more operations of the autonomous vehicle in the worksite environment using the first set of input data may comprise comparing, by the controller system, an actual path and/or a predicted path of the autonomous vehicle with an intended path to determine whether the vehicle behavior is unstable, and when the vehicle behavior is unstable, calculating, by the controller system, the first set of input data to stabilize the autonomous vehicle and bring the autonomous vehicle back into the intended path. The controlling may further comprise estimating, by the trained model, a third set of output data based on the first set of input data, determining, by the controller system, the first set of input data will stabilize the autonomous vehicle and bring the autonomous vehicle back into the intended path based on the estimation of the third set of output data, and generating, by the controller system, instruction for controlling the one or more operations of the autonomous vehicle in the worksite environment using the first set of input data.

With autonomous operation of the vehicle underway, at step 935 the trained model is continuously updated on a real time basis to calculate an updated posterior distribution and ultimately improve predictions for controlling the vehicle in the work-site environment. In some instances, actual output data is obtained, by the controller system, from the one or more operations of the autonomous vehicle in the worksite environment. In some instances, a sparse method is used for selecting new/additional data point from the actual output data for updating the trained model (e.g., not all data points being observed as the autonomous vehicle operates in the work-site environment will be used to update the model and calculate the updated posterior distribution). The controller system may update the trained model with the first set of input data and the actual output data. The Gaussian process of the updated trained model defines an updated posterior distribution over the one or more functions that define the relationship between the independent variables and the dependent variables for the operation of the autonomous vehicle in the worksite environment. Thereafter, the controller system may obtain a second set of sensor data providing another representation of operation of the autonomous vehicle in the worksite environment, and estimate, by the updated trained model, a second set of output data based on the second set of sensor data. The controller system controls the one or more operations of the autonomous vehicle in the worksite environment using input data defined based on the second set of sensor data and the second set of output data.

Figure 10:
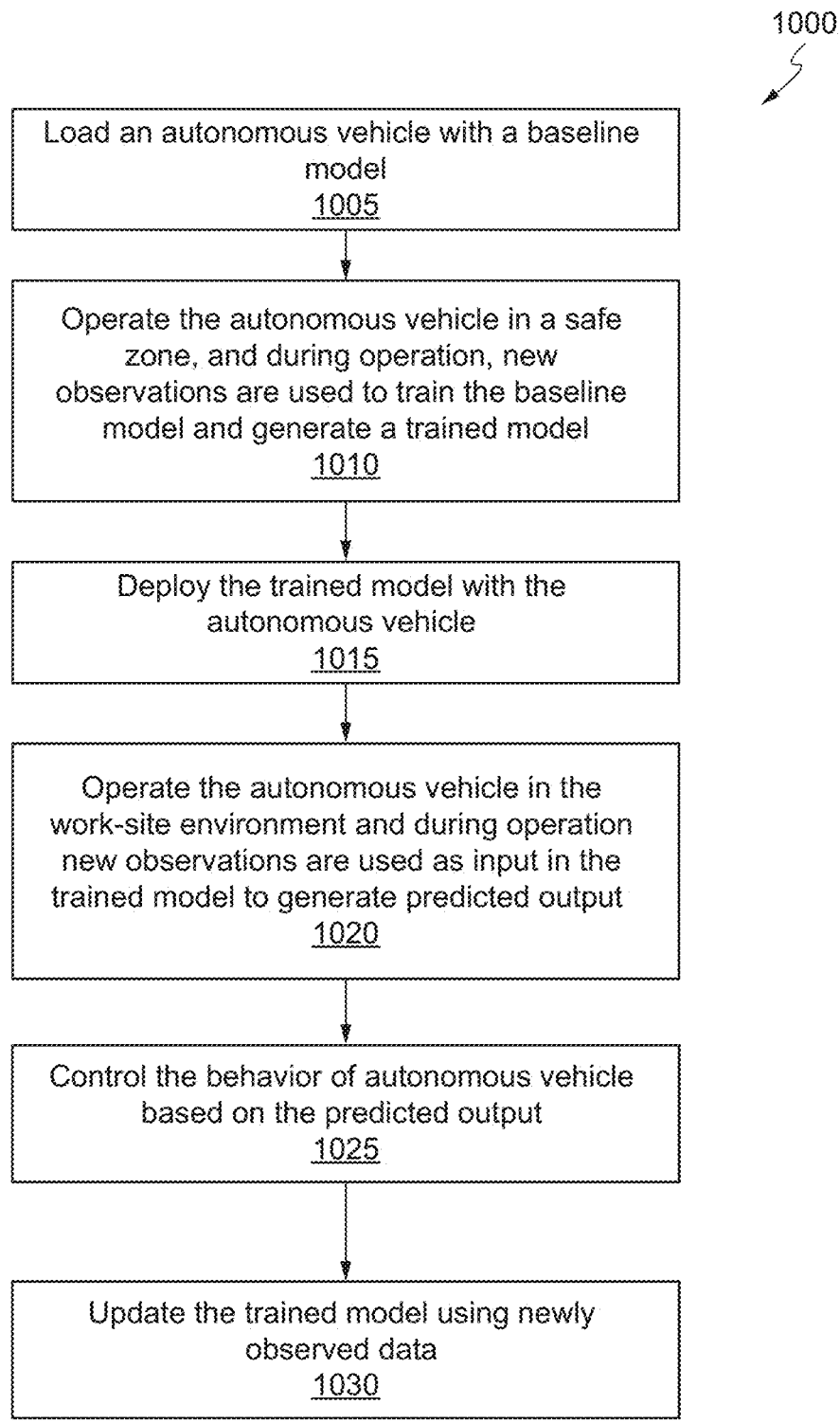
FIG. 10 is a flow chart illustrating an alternative process for real time update of a predictive model according to various embodiments.

FIG. 10 is a flow chart illustrating a process 1000 for the real time update of a predictive model according to various embodiments. The processing depicted in FIG. 10 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 10 and described below is intended to be illustrative and non-limiting. Although FIG. 10 depicts various processing steps occurring in a particular sequence or order, this is not intended to be limiting. In certain alternative embodiments, the steps may be performed in a different order, certain steps omitted, or some steps performed in parallel. In certain embodiments, such as in the embodiment depicted in FIGS. 2A and 4, the processing depicted in FIG. 10 may be performed by a machine learning model in a stability control subsystem (e.g., a machine learning model implementing the kinematic and dynamic behavior estimation module 420) in conjunction with a computing device or system configured to supply training input to the machine learning model for training of the machine learning model, such as in the embodiment depicted in FIG. 5.

At step 1005, an autonomous vehicle is loaded with a baseline model (e.g., a pre-trained model) trained and fitted on training samples collected in a work-site environment similar to an actual work-site environment. In some instances, the autonomous vehicle is loaded with a baseline model with a Gaussian process. The baseline model may be trained on sensor data collected during operation of the autonomous vehicle in another work-site environment substantially similar to the work-site environment. At step 1010, the autonomous vehicle is operated in a safe zone of the work-site environment (an area with substantially similar conditions to the work-site environment but reserved for testing to minimize harm to the vehicle, persons, machines, other vehicles, etc.) and during operation the base line model is continuously trained and updated in real time using select data points to calculate an updated posterior distribution (specific to the conditions of the work-site environment). In some instances, during the operating of the vehicle in the work site environment, a plurality of sensors collect a preliminary set of sensor data, and the controller system updates the baseline model with the preliminary set of sensor data to generate a trained model. The Gaussian process of the trained model defines the updated posterior distribution over the one or more functions that define a relationship between the independent variables and the dependent variables for the operation of the autonomous vehicle in the worksite environment.

At step 1015, once the baseline model is trained and updated with observed data from operation of the vehicle in the safe zone of the work-site environment, the trained model is fully deployed (e.g., in a system or computing device of the autonomous vehicle) having the updated posterior distribution for full autonomous operations in the work-site environment. The trained model may be deployed by uploading and saving the trained model in a system or computing device of the autonomous vehicle. In certain embodiments, the autonomous machine may already have an earlier version of the trained model deployed thereon. If so, the deployment in 920 may involve updating the existing model, e.g., by communicating functions and other parameters of the machine learning model to the autonomous vehicle. In certain embodiments, the trained model is optimized prior to deployment (e.g., hyperparameters may be optimized).

At step 1020, the autonomous vehicle is operated in the work-site environment and during operation new observations are used as input in the trained model to generate predicted output based on the updated posterior distribution. In some instances, a first set of sensor data is obtained by the controller system of the autonomous vehicle. The first set of sensor data provides a representation of operation of the autonomous vehicle in the worksite environment. A first set of output data may be estimated by the trained model based on the first set of sensor data. The Gaussian process of the trained model defines the updated posterior distribution over one or more functions.

At step 1025, the predicted output is used to improve control of the autonomous vehicle as described in detail herein. In some instances, one or more operations of the autonomous vehicle in the worksite environment are controlled by the controller system using a first set of input data. The first set of input data is derived from the first set of sensor data and the first set of output data. For example, the controlling the one or more operations of the autonomous vehicle in the worksite environment using the first set of input data may comprise comparing, by the controller system, an actual path and/or a predicted path of the autonomous vehicle with an intended path to determine whether the vehicle behavior is unstable, and when the vehicle behavior is unstable, calculating, by the controller system, the first set of input data to stabilize the autonomous vehicle and bring the autonomous vehicle back into the intended path. The controlling may further comprise estimating, by the trained model, a third set of output data based on the first set of input data, determining, by the controller system, the first set of input data will stabilize the autonomous vehicle and bring the autonomous vehicle back into the intended path based on the estimation of the third set of output data, and generating, by the controller system, instruction for controlling the one or more operations of the autonomous vehicle in the work-site environment using the first set of input data.

With autonomous operation of the vehicle underway, at step 1030 the trained model is continuously updated on a real time basis to recalculate the updated posterior distribution and ultimately improve predictions for controlling the vehicle in the work-site environment. In some instances, actual output data is obtained, by the controller system, from the one or more operations of the autonomous vehicle in the worksite environment. In some instances, a sparse method is used for selecting new/additional data point from the actual output data for updating the trained model (e.g., not all data points being observed as the autonomous vehicle operates in the work-site environment will be used to update the model and calculate the updated posterior distribution). The controller system may update the trained model with the first set of input data and the actual output data. The Gaussian process of the updated trained model defines an updated posterior distribution over the one or more functions that define the relationship between the independent variables and the dependent variables for the operation of the autonomous vehicle in the worksite environment. Thereafter, the controller system may obtain a second set of sensor data providing another representation of operation of the autonomous vehicle in the worksite environment, and estimate, by the updated trained model, a second set of output data based on the second set of sensor data. The controller system controls the one or more operations of the autonomous vehicle in the worksite environment using input data defined based on the second set of sensor data and the second set of output data.

Figure 11:
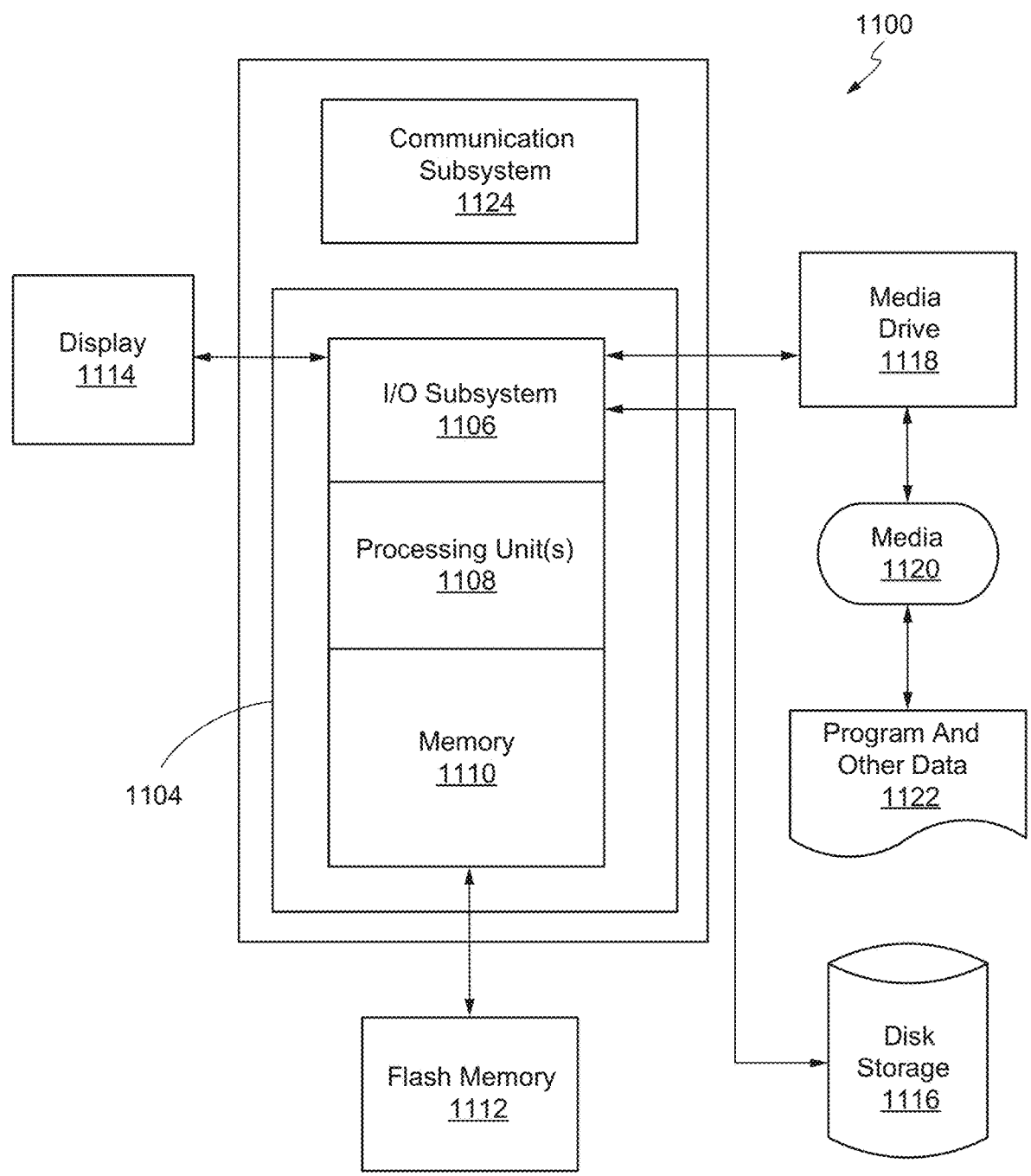
FIG. 11 depicts a simplified block diagram of an exemplary computing system that can be used to implement one or more of the systems and subsystems described in this disclosure and/or to perform any one of the processes or methods described herein.

FIG. 11 depicts a simplified block diagram of an exemplary computing system 1100 that can be used to implement one or more of the systems and subsystems described in this disclosure and/or to perform any one of the processes or methods described herein. For example, in embodiments where autonomous vehicle management system is implemented in software, the software may be executed by a computing system such as computing system 1100 depicted in FIG. 11. Computing system 1100 may include, for example, a processor, memory, storage, and I/O devices (e.g., a monitor, a keyboard, a disk drive, an Internet connection, etc.). In some instances, computing system 1100 may also include other components, circuitry, or other specialized hardware for carrying out specialized functions. In some operational settings, computing system 1100 may be configured as a system that includes one or more units, each of which is configured to carry out some aspects of the processes either in software only, hardware only, or some combination thereof. Computing system 1100 can be configured to include additional systems in order to fulfill various functionalities.

As depicted in embodiment in FIG. 11, computing system 1100 includes one or more processing units 1108, a set of memories (including system memory 1110, computer-readable media 1120, and disk storage 1116), and an I/O subsystem 1106. These components may be communicatively coupled to each other via a bus subsystem that provides a mechanism for the various systems and subsystems of computing system 1100 to communicate with each other as intended. The bus subsystem can be any of several types of bus structures including a memory bus or memory controller, a peripheral bus, a local bus using any of a variety of bus architectures, and the like. In some embodiments, components 1106, 1108 and 1110 may be located on a motherboard 1104.

Processing units 1108 may include one or more processors. The processors may be single or multicore processors. Processor units 1108 can also be implemented using customized circuits, such as application specific integrated circuits (ASICs), or field programmable gate arrays (FPGAs). The processors are configured to execute instructions (e.g., programs, code, etc.) stored in the various memories, such as in system memory 1110, on computer readable storage media 1120, or on disk 1116. The programs or processes may be executed sequentially or in parallel. In certain embodiments, computing system 1100 may provide a virtualized computing environment executing one or more virtual machines. In such embodiments, one or more processors or cores of processors may be allocated to each virtual machine. In some embodiments, a processing unit 1108 may include special purpose co-processors such as graphics processors (GPUs), digital signal processors (DSPs), or the like.

The set of memories can include one or more non-transitory memory devices, including volatile and non-volatile memory devices. Software (programs, code modules, instructions) that, when executed by one or more processors of the processing unit(s) 1108 provide the functionality described herein, may be stored in one or more of the memories. Flash memory 1112 may also be included in certain embodiments. System memory 1110 may include a number of memories including a volatile main random access memory (RAM) (e.g., static random access memory (SRAM), dynamic random access memory (DRAM), and the like) for storage of instructions and data during program execution and a non-volatile read only memory (ROM) or flash memory in which fixed instructions are stored. In some implementations, a basic input/output system (BIOS), containing the basic routines that help to transfer information between elements within computer system 1100, such as during start-up, may typically be stored in the ROM. The RAM typically contains data and/or program modules that are presently being operated and executed by the processing unit(s) 1108.

Executable code, program instructions, applications, and program data may be loaded into system memory 1110 and executed by one or more processors of processing unit(s) 1108. One or more operating systems may also be loaded into system memory 1110. Examples of operating systems include, without limitation, different versions of Microsoft Windows®, Apple Macintosh®, Linux operating systems, and/or mobile operating systems such as iOS, Windows® Phone, Android® OS, BlackBerry® OS, Palm® OS operating systems, and others.

In certain embodiments, programming modules and instructions, data structures, and other data (collectively 1122) that are used to provide the functionality of some embodiments may be stored on computer-readable media 1120. A media drive 1118 connected to computing system 1100 may be provided for reading information from and/or writing information to computer-readable media 1120. Computer-readable media 1120 may include non-volatile memory such as a magnetic disk drive, an optical disk drive such as a CD ROM, DVD, a Blu-Ray® disk, or other optical media, Zip® drives, various types of memory cards and drives (e.g., a USB flash drive, SD cards), DVD disks, digital video tape, solid-state drives (SSD), and the like.

I/O subsystem 1106 may include devices and mechanisms for inputting information to computing system 1100 and/or for outputting information from or via computing system 1100. In general, use of the term input device is intended to include all possible types of devices and mechanisms for inputting information to computing system 1100. Input mechanisms may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, cameras, digital camcorders, portable media players, webcams, image scanners, fingerprint scanners, barcode readers, and the like. In general, use of the term output device is intended to include all possible types of devices and mechanisms for outputting information from computing system 1100 to a user or other computer. Such output devices may include one or more types of displays, indicator lights, or non-visual displays such as audio output devices, printers, speakers, headphones, voice output devices, etc. I/O subsystem 1106 may also include interfaces to input and/or output devices external to the I/O subsystem 1106, such as a display 1114.

Computing system 1100 may include a communications subsystem 1124 that provides an interface for computing system 1100 to communicate (e.g., receive data, send data) with other computer systems and networks. Communication subsystem 1124 may support both wired and/or wireless communication protocols. For example, communication subsystem 1124 may enable computing system 1100 to be communicatively coupled with remote sensors, with a network such as the Internet, and the like. Various different communication protocols and formats may be used for the communications such Wi-Fi, Bluetooth® (and/or other standards for exchanging data over short distances includes those using short-wavelength radio transmissions), USB, Ethernet, cellular, an ultrasonic local area communication protocol, etc.

Computing system 1100 can be one of various types, including a mobile device (e.g., a cellphone, a tablet, a PDA, etc.), a personal computer, a workstation, or any other data processing system. Due to the ever-changing nature of computers and networks, the description of computer system 1100 depicted in FIG. 11 is intended only as a specific example. Many other configurations having more or fewer components than the system depicted in FIG. 11 are possible.

At least some values based on the results of the above-described processes can be saved for subsequent use. Additionally, a computer-readable medium can be used to store (e.g., tangibly embody) one or more computer programs for performing any one of the above-described processes by means of a computer. The computer program may be written, for example, in a general-purpose programming language (e.g., Pascal, C, C++, Java, Python) and/or some specialized application-specific language (PHP, JavaScript, XML). It is noted that JavaScript has been used as an example in several embodiments. However, in other embodiments, another scripting language and/or JavaScript variants can be utilized as well.

The described features, structures, or characteristics of described in this disclosure may be combined in any suitable manner in one or more embodiments. In the description herein, numerous specific details are provided, such as examples of programming, software modules, user selections, network transactions, database queries, database structures, hardware modules, hardware circuits, hardware chips, etc., to provide a thorough understanding of various embodiments. One skilled in the relevant art will recognize, however, that the features may be practiced without one or more of the specific details, or with other methods, components, materials, and so forth. In other instances, well-known structures, materials, or operations are not shown or described in detail to avoid obscuring novel aspects.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Although specific embodiments have been described, various modifications, alterations, alternative constructions, and equivalents are possible. Embodiments are not restricted to operation within certain specific data processing environments, but are free to operate within a plurality of data processing environments. Additionally, although certain embodiments have been described using a particular series of transactions and steps, it should be apparent to those skilled in the art that this is not intended to be limiting. Although some flow charts describe operations as a sequential process, many of the operations can be performed in parallel or concurrently. In addition, the order of the operations may be rearranged. A process may have additional steps not included in the figure. Various features and aspects of the above-described embodiments may be used individually or jointly.

Further, while certain embodiments have been described using a particular combination of hardware and software, it should be recognized that other combinations of hardware and software are also possible. Certain embodiments may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of other embodiments. Rather, the preceding description of the embodiments will provide those skilled in the art with an enabling description for implementing various embodiments. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A method comprising:
obtaining, by a controller system of an autonomous vehicle, a first set of sensor data providing a representation of operation of the autonomous vehicle in a worksite environment, wherein the first set of sensor data includes input data used for control of the autonomous vehicle during operation of the autonomous vehicle in the work-site environment;
estimating, by a trained model comprising a Gaussian process, a first set of output data based on the first set of sensor data and a posterior distribution, wherein the Gaussian process of the trained model defines the posterior distribution over one or more functions that define a relationship between independent variables and dependent variables for operation of the autonomous vehicle in the worksite environment, wherein the independent variables are input data for control of the autonomous vehicle during operation of the autonomous vehicle in the work-site environment, and wherein the dependent variables are output data of the autonomous vehicle in the work-site environment achieved as a result of the input data for the control of the autonomous vehicle;
controlling, by the controller system, one or more operations of the autonomous vehicle in the worksite environment using a first set of input data, wherein the first set of input data is derived from the first set of sensor data and the first set of output data;
obtaining, by the controller system, actual output data observed from the one or more operations of the autonomous vehicle in the worksite environment;
selecting, by the controller system, a subset of data points from a plurality of data points pertaining to the first set of input data and the actual output data, wherein the subset of data points is selected based on a proximity of the subset of the data points to existing data points used for calculating the posterior distribution; and
updating, by the controller system, the trained model with the subset of data points, wherein the updating comprises recalculating the posterior distribution using the subset of data points to generate an updated posterior distribution, and wherein the Gaussian process of the updated trained model defines the updated posterior distribution over the one or more functions that define the relationship between the independent variables and the dependent variables for the operation of the autonomous vehicle in the worksite environment.

2. The method of claim 1, further comprising:
obtaining, by the controller system, a second set of sensor data providing another representation of operation of the autonomous vehicle in the worksite environment;
estimating, by the updated trained model, a second set of output data based on the second set of sensor data, wherein the Gaussian process of the updated trained model defines the updated posterior distribution over the one or more functions; and
controlling, by the controller system, one or more operations of the autonomous vehicle in the worksite environment using input data defined based on the second set of sensor data and the second set of output data, wherein the selecting comprises implementing a sparse method for selecting the subset of data points from the plurality of data points.

3. The method of claim 2, further comprising:
operating the autonomous vehicle in the worksite environment, wherein the autonomous vehicle is operated manually or via remote control;
during the operating of the vehicle in the work site environment, collecting, by a plurality of sensors, a training set of sensor data; and
training a model with a Gaussian process using the training set of sensor data to generate the trained model, wherein the Gaussian process of the model defines a prior distribution over the one or more functions that define the relationship between the independent variables and the dependent variables for the operation of the autonomous vehicle in the worksite environment, and the training comprises calculating the posterior distribution over the one or more functions for the trained model based on the training set of sensor data.

4. The method of claim 2, further comprising:
loading a baseline model with a Gaussian process onto the autonomous vehicle, wherein the baseline model is trained on sensor data collected during operation of the autonomous vehicle in another work-site environment substantially similar to the work-site environment;
operating, by the controller system, the autonomous vehicle in a safe-zone of the worksite environment;
during the operating of the vehicle in the work site environment, collecting, by a plurality of sensors, a preliminary set of sensor data; and
updating, by the controller system, the baseline model with the preliminary set of sensor data to generate the trained model, wherein the Gaussian process of the trained model defines the posterior distribution over the one or more functions.

5. The method of claim 1, further comprising:
performing, by a localization subsystem of the autonomous vehicle, a consistency check on the first set of sensor data;
generating, by a perception subsystem of the autonomous vehicle, an internal map based upon the first set of sensor data, wherein the internal map is a three-dimensional map of the work-site environment; and
generating, by a planning subsystem of the autonomous vehicle, a plan of action using the internal map and based upon a goal to be achieved by the autonomous vehicle, wherein the one or more operations of the autonomous vehicle are controlled in the worksite environment based on the plan of action to achieve the goal.

6. The method of claim 1, wherein the controlling the one or more operations of the autonomous vehicle in the worksite environment using the first set of input data comprises:
comparing, by the controller system, an actual path and/or a predicted path of the autonomous vehicle with an intended path to determine whether vehicle behavior is unstable;
when the vehicle behavior is unstable, calculating, by the controller system, the first set of input data to stabilize the autonomous vehicle and bring the autonomous vehicle back into the intended path;
estimating, by the trained model, a third set of output data based on the first set of input data;
determining, by the controller system, the first set of input data will stabilize the autonomous vehicle and bring the autonomous vehicle back into the intended path based on the estimation of the third set of output data; and generating, by the controller system, instruction for controlling the one or more operations of the autonomous vehicle in the worksite environment using the first set of input data.

7. The method of claim 1, wherein the independent variables include position or displacement of joy stick or accelerator, steering position or angle, position or displacement of brake, road elevation angle, air temperature, humidity or a combination thereof while the autonomous vehicle is in operation, and the dependent variables include the linear velocity, angular velocity, or a combination thereof while the autonomous vehicle is in operation.

8. A system comprising:
one or more data processors; and
a non-transitory computer readable storage medium containing instructions which, when executed on the one or more data processors, cause the one or more data processors to perform actions including:
obtaining, by a controller system of an autonomous vehicle, a first set of sensor data providing a representation of operation of the autonomous vehicle in a worksite environment, wherein the first set of sensor data includes input data used for control of the autonomous vehicle during operation of the autonomous vehicle in the work-site environment;
estimating, by a trained model comprising a Gaussian process, a first set of output data based on the first set of sensor data and a posterior distribution, wherein the Gaussian process of the trained model defines the posterior distribution over one or more functions that define a relationship between independent variables and dependent variables for operation of the autonomous vehicle in the worksite environment, wherein the independent variables are input data for control of the autonomous vehicle during operation of the autonomous vehicle in the work-site environment, and wherein the dependent variables are output data of the autonomous vehicle in the work-site environment achieved as a result of the input data for the control of the autonomous vehicle;
controlling, by the controller system, one or more operations of the autonomous vehicle in the worksite environment using a first set of input data, wherein the first set of input data is derived from the first set of sensor data and the first set of output data;
obtaining, by the controller system, actual output data observed from the one or more operations of the autonomous vehicle in the worksite environment;
selecting, by the controller system, a subset of data points from a plurality of data points pertaining to the first set of input data and the actual output data, wherein the subset of data points is selected based on a proximity of the subset of the data points to existing data points used for calculating the posterior distribution; and
updating, by the controller system, the trained model with the subset of data points, wherein the updating comprises recalculating the posterior distribution using the subset of data points to generate an updated posterior distribution, and wherein the Gaussian process of the updated trained model defines the updated posterior distribution over one or more functions that define the relationship between the independent variables and the dependent variables for the operation of the autonomous vehicle in the worksite environment.

9. The system of claim 8, wherein the actions further comprise:
obtaining, by the controller system, a second set of sensor data providing another representation of operation of the autonomous vehicle in the worksite environment;
estimating, by the updated trained model, a second set of output data based on the second set of sensor data, wherein the Gaussian process of the updated trained model defines the updated posterior distribution over the one or more functions; and
controlling, by the controller system, one or more operations of the autonomous vehicle in the worksite environment using input data defined based on the second set of sensor data and the second set of output data,
wherein the selecting comprises implementing a sparse method for selecting the subset of data points from the plurality of data points.

10. The system of claim 9, wherein the actions further comprise:
operating the autonomous vehicle in the worksite environment, wherein the autonomous vehicle is operated manually or via remote control;
during the operating of the vehicle in the work site environment, collecting, by a plurality of sensors, a training set of sensor data; and
training a model with a Gaussian process using the training set of sensor data to generate the trained model, wherein the Gaussian process of the model defines a prior distribution over the one or more functions that define the relationship between the independent variables and the dependent variables for the operation of the autonomous vehicle in the worksite environment, and the training comprises calculating the posterior distribution over the one or more functions for the trained model based on the training set of sensor data.

11. The system of claim 9, wherein the actions further comprise:
loading a baseline model with a Gaussian process onto the autonomous vehicle, wherein the baseline model is trained on sensor data collected during operation of the autonomous vehicle in another work-site environment substantially similar to the work-site environment;
operating, by the controller system, the autonomous vehicle in a safe-zone of the worksite environment;
during the operating of the vehicle in the work site environment, collecting, by a plurality of sensors, a preliminary set of sensor data; and
updating, by the controller system, the baseline model with the preliminary set of sensor data to generate the trained model, wherein the Gaussian process of the trained model defines the posterior distribution over the one or more functions.

12. The system of claim 8, wherein the actions further comprise:
performing, by a localization subsystem of the autonomous vehicle, a consistency check on the first set of sensor data;
generating, by a perception subsystem of the autonomous vehicle, an internal map based upon the first set of sensor data, wherein the internal map is a three-dimensional map of the work-site environment; and generating, by a planning subsystem of the autonomous vehicle, a plan of action using the internal map and based upon a goal to be achieved by the autonomous vehicle, wherein the one or more operations of the autonomous vehicle are controlled in the worksite environment based on the plan of action to achieve the goal.

13. The system of claim 8, wherein the controlling the one or more operations of the autonomous vehicle in the worksite environment using the first set of input data comprises:

comparing, by the controller system, an actual path and/or a predicted path of the autonomous vehicle with an intended path to determine whether vehicle behavior is unstable;

when the vehicle behavior is unstable, calculating, by the controller system, the first set of input data to stabilize the autonomous vehicle and bring the autonomous vehicle back into the intended path;

estimating, by the trained model, a third set of output data based on the first set of input data;

determining, by the controller system, the first set of input data will stabilize the autonomous vehicle and bring the autonomous vehicle back into the intended path based on the estimation of the third set of output data; and generating, by the controller system, instruction for controlling the one or more operations of the autonomous vehicle in the worksite environment using the first set of input data.

14. The system of claim 8, wherein the independent variables include position or displacement of joy stick or accelerator, steering position or angle, position or displacement of brake, road elevation angle, air temperature, humidity or a combination thereof while the autonomous vehicle is in operation, and the dependent variables include the linear velocity, angular velocity, or a combination thereof while the autonomous vehicle is in operation.

15. A computer-program product tangibly embodied in a non-transitory machine-readable storage medium, including instructions configured to cause one or more data processors to perform actions including:

obtaining, by a controller system of an autonomous vehicle, a first set of sensor data providing a representation of operation of the autonomous vehicle in a worksite environment, wherein the first set of sensor data includes input data used for control of the autonomous vehicle during operation of the autonomous vehicle in the work-site environment;

estimating, by a trained model comprising a Gaussian process, a first set of output data based on the first set of sensor data and a posterior distribution, wherein the Gaussian process of the trained model defines the posterior distribution over one or more functions that define a relationship between independent variables and dependent variables for operation of the autonomous vehicle in the worksite environment, wherein the independent variables are input data for control of the autonomous vehicle during operation of the autonomous vehicle in the work-site environment, and wherein the dependent variables are output data of the autonomous vehicle in the work-site environment achieved as a result of the input data for the control of the autonomous vehicle;

controlling, by the controller system, one or more operations of the autonomous vehicle in the worksite environment using a first set of input data, wherein the first set of input data is derived from the first set of sensor data and the first set of output data;

obtaining, by the controller system, actual output data observed from the one or more operations of the autonomous vehicle in the worksite environment;

selecting, by the controller system, a subset of data points from a plurality of data points pertaining to the first set of input data and the actual output data, wherein the subset of data points is selected based on a proximity of the subset of the data points to existing data points used for calculating the posterior distribution; and updating, by the controller system, the trained model with the subset of data points, wherein the updating comprises recalculating the posterior distribution using the subset of data points to generate an updated posterior distribution, and wherein the Gaussian process of the updated trained model defines the updated posterior distribution over one or more functions that define the relationship between the independent variables and the dependent variables for the operation of the autonomous vehicle in the worksite environment.

16. The computer-program product of claim 15, wherein the actions further comprise:

obtaining, by the controller system, a second set of sensor data providing another representation of operation of the autonomous vehicle in the worksite environment;

estimating, by the updated trained model, a second set of output data based on the second set of sensor data, wherein the Gaussian process of the updated trained model defines the updated posterior distribution over the one or more functions; and controlling, by the controller system, one or more operations of the autonomous vehicle in the worksite environment using input data defined based on the second set of sensor data and the second set of output data, wherein the selecting comprises implementing a sparse method for selecting the subset of data points from the plurality of data points.

17. The computer-program product of claim 16, wherein the actions further comprise:

operating the autonomous vehicle in the worksite environment, wherein the autonomous vehicle is operated manually or via remote control;

during the operating of the vehicle in the work site environment, collecting, by a plurality of sensors, a training set of sensor data; and training a model with a Gaussian process using the training set of sensor data to generate the trained model, wherein the Gaussian process of the model defines a prior distribution over the one or more functions that define the relationship between the independent variables and the dependent variables for the operation of the autonomous vehicle in the worksite environment, and the training comprises calculating the posterior distribution over the one or more functions for the trained model based on the training set of sensor data.

18. The computer-program product of claim 16, wherein the actions further comprise:

loading a baseline model with a Gaussian process onto the autonomous vehicle, wherein the baseline model is trained on sensor data collected during operation of the autonomous vehicle in another work-site environment substantially similar to the work-site environment;

operating, by the controller system, the autonomous vehicle in a safe-zone of the worksite environment;

during the operating of the vehicle in the work site environment, collecting, by a plurality of sensors, a preliminary set of sensor data; and updating, by the controller system, the baseline model with the preliminary set of sensor data to generate the trained model, wherein the Gaussian process of the trained model defines the posterior distribution over the one or more functions.

19. The computer-program product of claim 15, wherein the actions further comprise:
   performing, by a localization subsystem of the autonomous vehicle, a consistency check on the first set of sensor data;
   generating, by a perception subsystem of the autonomous vehicle, a internal map based upon the first set of sensor data, wherein the internal map is a three-dimensional map of the work-site environment; and
   generating, by a planning subsystem of the autonomous vehicle, a plan of action using the internal map and based upon a goal to be achieved by the autonomous vehicle,
   wherein the one or more operations of the autonomous vehicle are controlled in the worksite environment based on the plan of action to achieve the goal.

20. The computer-program product of claim 15, wherein the controlling the one or more operations of the autonomous vehicle in the worksite environment using the first set of input data comprises:
   comparing, by the controller system, an actual path and/or a predicted path of the autonomous vehicle with an intended path to determine whether vehicle behavior is unstable;
   when the vehicle behavior is unstable, calculating, by the controller system, the first set of input data to stabilize the autonomous vehicle and bring the autonomous vehicle back into the intended path;
   estimating, by the trained model, a third set of output data based on the first set of input data;
   determining, by the controller system, the first set of input data will stabilize the autonomous vehicle and bring the autonomous vehicle back into the intended path based on the estimation of the third set of output data; and
   generating, by the controller system, instruction for controlling the one or more operations of the autonomous vehicle in the worksite environment using the first set of input data.

* * * * *